United States Patent [19]
Kikushima et al.

[11] Patent Number: 5,896,216
[45] Date of Patent: Apr. 20, 1999

[54] AM/PM CONVERTER AND OPTICAL SIGNAL TRANSMISSION SYSTEM

[75] Inventors: Koji Kikushima; Nori Shibata; Kouichi Suto, all of Yokosuka; Katsushi Iwashita, Miura; Satoshi Ikeda, Yokosuka; Hiroshi Nakamoto, Kodaira; Chisei Kishimoto, Yokosuka; Kiyomi Kumozaki, Zushi; Naoya Sakurai, Tokyo, all of Japan

[73] Assignee: Nippon Telegraph and Telephone Corporation, Tokyo, Japan

[21] Appl. No.: 08/671,819

[22] Filed: Jun. 25, 1996

[30] Foreign Application Priority Data

Apr. 5, 1996 [JP] Japan .................. 8-084093

[51] Int. Cl.$^6$ .................................. H04B 10/04
[52] U.S. Cl. .................. 359/182; 359/181; 359/187; 359/188; 359/191
[58] Field of Search .................. 359/161, 181, 359/180, 182, 187, 188, 191, 192

[56] References Cited

U.S. PATENT DOCUMENTS

| | | | |
|---|---|---|---|
| 4,918,474 | 4/1990 | Bekooji | 359/191 |
| 5,060,312 | 10/1991 | Delavaux | 359/192 |
| 5,212,579 | 5/1993 | Huber et al. | 359/181 |
| 5,422,752 | 6/1995 | Hardcastle | 359/187 |
| 5,550,667 | 8/1996 | Krimmel et al. | 359/180 |

FOREIGN PATENT DOCUMENTS 0 503 512 A2  9/1992  European Pat. Off. .

OTHER PUBLICATIONS

L.G. Kazovsky et al., "Coherent Analog FM–SCM Video Transmission Using Direct Frequency Modulation of Semiconductor Lasers," Proceeedings of the Optical Fiber Communication Conference, San Jose, Feb. 2–7, 1992.

Satoyuki Matsui et al., "A Novel Optical Receiver For AM/QAM/FM Hybrid SCM Video Distribution Systems, "IEICE Transactions on Communications, vol. E76–B, Sep. 1, 1993, pp. 1159–1168.

Way et al., "160–Channel FM–Video Tramsmission Using Optical FM/FDM and Subcarrier Multiplexing and an Erbium Doped Optical Fibre Amplifier," Electronics Letters, vol. 26, No. 2, Jan. 18, 1990, pp. 139–142.

Kikushima et al., "150–km Non–Repeated 60–Channel AM–Video Transmission Employing Optical Heterodyne AM/FM Converter", 21st European Conference on Optical Communication ECOC'95, pp. 1047–1050, Sep. 1995.

Haga et al., "A Study of Optical Access Network System for Multi–Media Applications", IEICE of Japan, pp. 13–18, Apr. 1996. (With English Abstract).

Yoshinaga et al., "Service Area Enlargement of AM–CATV Delivery System", VII International Workshop On Optical Access Networks Conference Proceedings, pp. 7.6–1 to 7.6–6, Sep. 1995.

Suzuki et al., "Pulsed FM single subcarrier optical analog CATV distribution system", IEICE of Japan, B–603, Sep. 1991.

(List continued on next page.)

*Primary Examiner*—Leslie Pascal
*Attorney, Agent, or Firm*—Finnegan, Henderson, Farabow, Garrett & Dunner, L.L.P.

[57] ABSTRACT

The AM/FM converter of the present invention comprises an optical frequency modulation section which receives multi-channel AM video signals and outputs an optical-frequency-modulated optical signal beam; and an optical heterodyne detection section comprising an optical frequency oscillator composed of a semiconductor local laser which outputs a local oscillator optical beam having an optical frequency separated by a designated intermediate frequency, an optical coupler, and a photoelectric converter composed of a photodiode, which receives the optical signal beam and outputs an electrical batched FM modulation signal which is frequency-modulated and frequency-converted to the intermediate frequency. By means of this configuration, the invention offers an AM/FM converter wherein the frequency band is made considerably wider.

31 Claims, 20 Drawing Sheets

OTHER PUBLICATIONS

Dakin et al., "A Novel 3-Wave Mixing Heterodyne Approach to Coherent Optical Communications", 12th European Conference on Optical Communication, pp. 33–37, Sep. 1986.

Cheng et al., "Phase–Noise–Canceling Dual–Frequency Heterodyne Optical Fibre Communication System", Electronics Letters, 25(13):835–836, Jun. 1989.

Shimada, "Coherent Lightwave Communications Technology", pp. 76–79.

ELECTRICAL BATCHED MODULATION
FM COMPONENTS

AM VIDEO SIGNALS

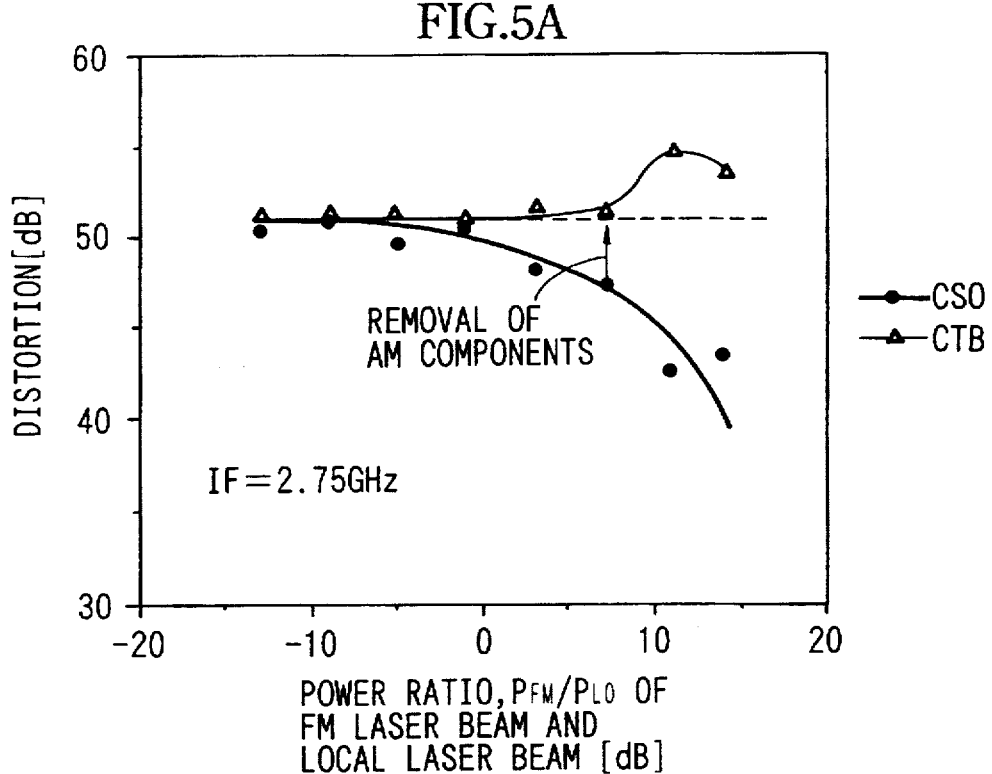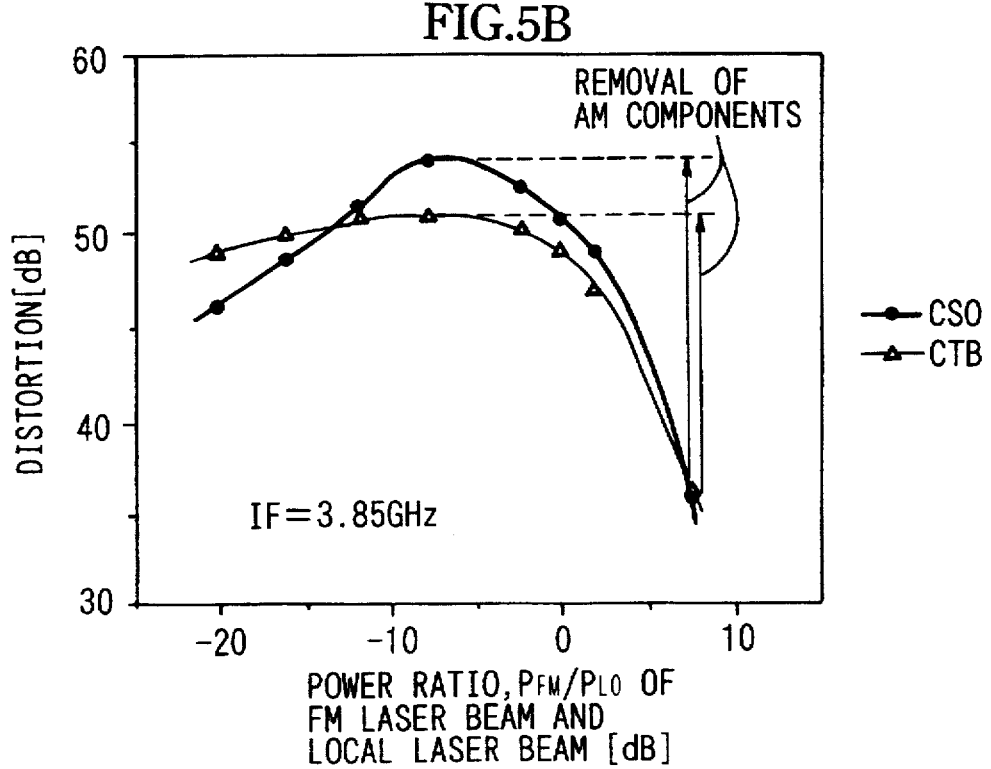

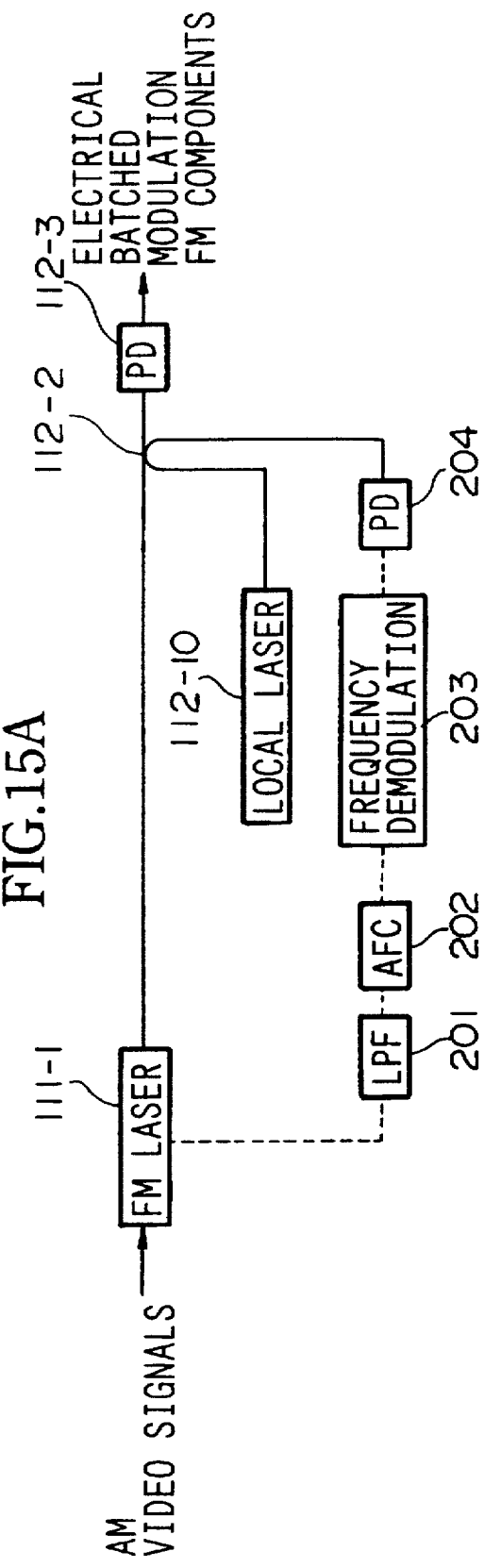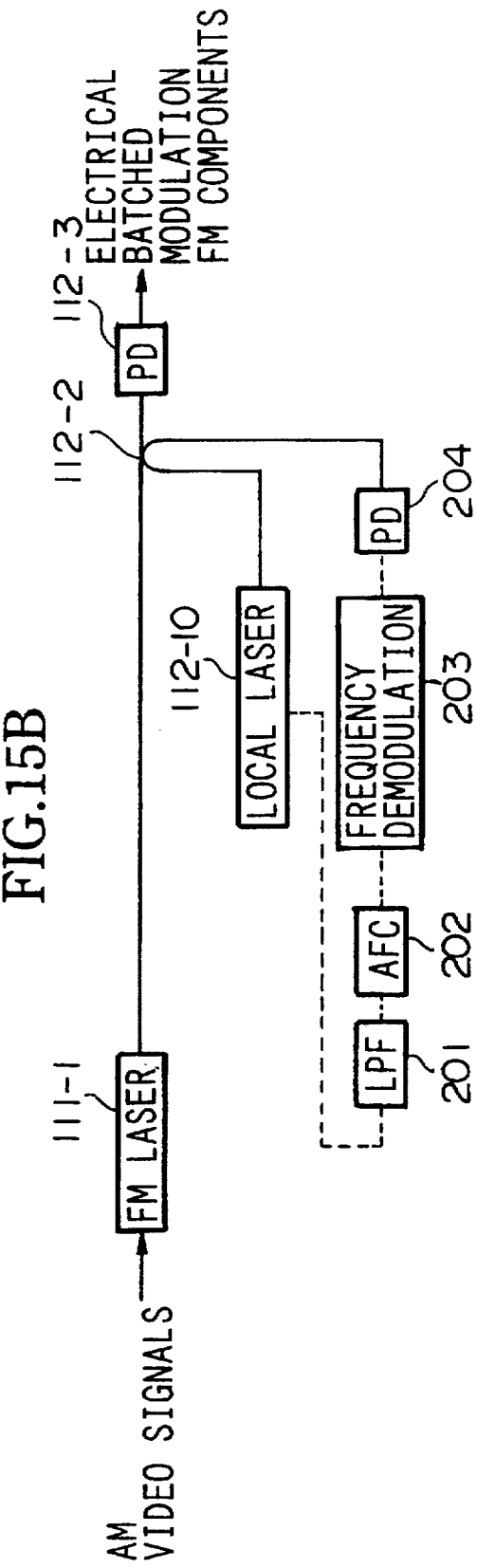

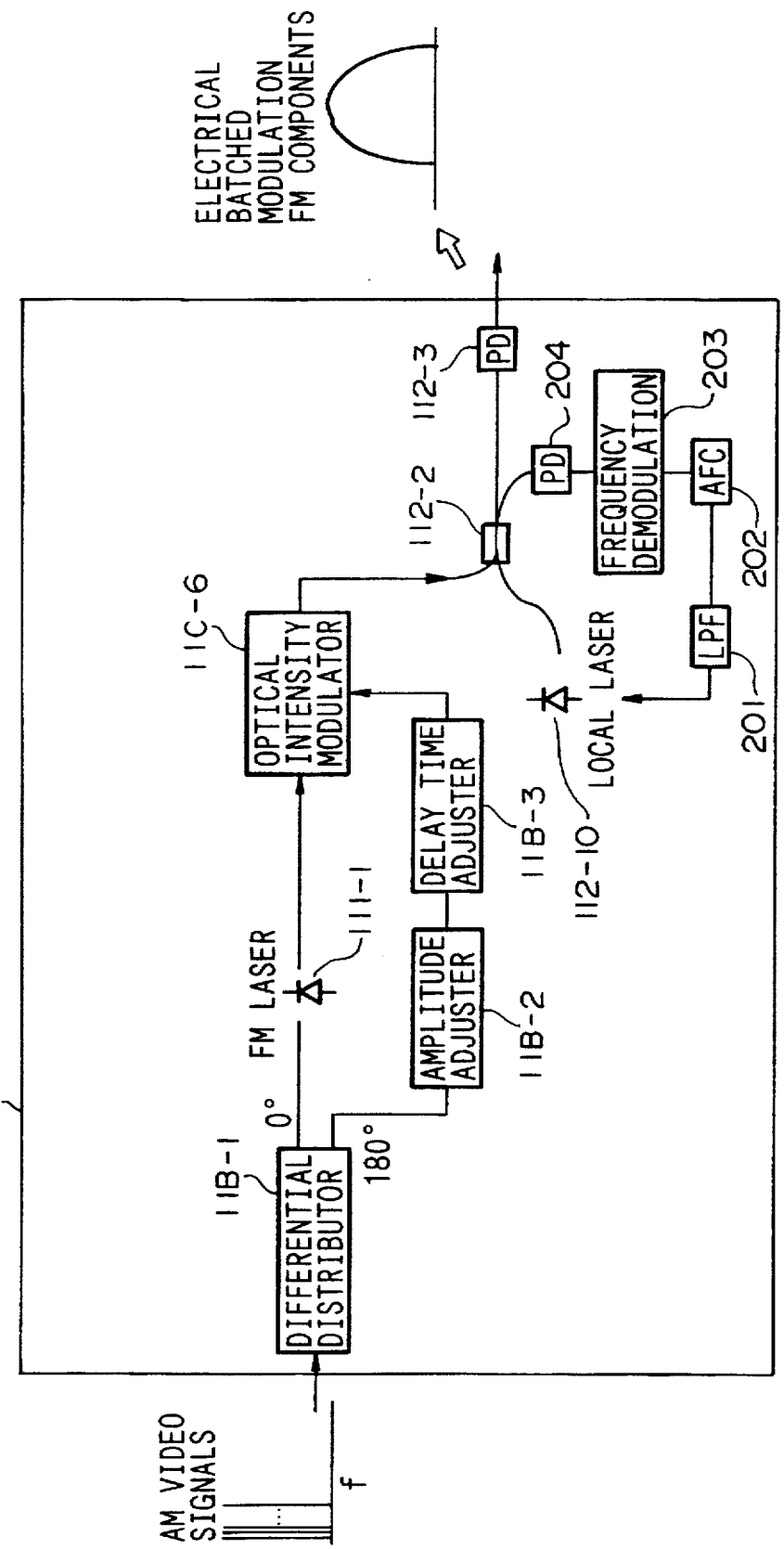

AM/PM CONVERTER AND OPTICAL SIGNAL TRANSMISSION SYSTEM

BACKGROUND OF THE INVENTION

1. Technical Field of the Invention

The present invention relates to AM/FM converters and optical signal transmission systems used for optical transmissions of wideband signals. More specifically, the present invention relates to AM/FM converters and optical signal transmission systems which are suitable for optical transmissions of frequency-division-multiplexed amplitude-modulated multi-channel video signals, and are especially suited to use in optical subscriber systems based on passive-double-star (PDS) topologies.

2. Background Art

At present, many countries are vigorously pursuing research and development of optical transmission formats for transmitting wideband electrical signals by conversion into optical signals, as methods for transmitting multi-channel video signals. An optical transmission format wherein a semiconductor laser is intensity-modulated in proportion to the amplitudes of amplitude-modulated multi-channel video signals (hereinafter referred to as the AM-TV transmission format) is principally used for mainline optical transmissions of cable television. However, since the AM-TV transmission format has a low resistance to noise, the transmitting/receiving level difference cannot be too large; thus, the transmission length and the number of optical splitters in the optical transmission system are restricted.

In order to resolve this problem, an optical transmission format has been developed wherein a semiconductor laser is intensity-modulated based on video signals which are frequency-modulated separately by channel (hereinafter referred to as the FM-TV transmission format). Since the FM-TV transmission format with separate video channels is highly resistant to noise, the transmission length and the optical splitter number can be made large in an optical transmission system with a large transmitting/receiving level difference. However, this format has the drawback that the channels must be selected for demodulation, so that the receiver becomes expensive due to the need for complicated wideband channel selection circuits.

On the other hand, a format has been developed wherein a semiconductor laser is intensity-modulated based on multi-channel video signals which are frequency-modulated by batches over multiple channels and demodulated by batches into multi-channel video signals (hereinafter referred to as the batched FM-TV transmission format). The batched FM-TV transmission format is highly resistant to noise, so that the transmission length and the optical splitter number may be large in optical transmission systems with large transmitting/receiving level differences. Moreover, the optically transmitted signals are wideband but may be demodulated by simple circuits using high-speed ICs. Thus, the channels can be selected by means of normal cable-TV tuners, so that the receivers can be made cheaply. However, modulators which frequency-modulate multi-channel video signals by batches conventionally use voltage controlled oscillators (hereinafter referred to as VCOs), so that the frequency band for modulation is limited by the restrictions to the input frequency band of the VCOs. The highest frequency able to be handled by vCos is 200 MHz, because the input impedance to the VCOs increase with increased frequencies. Assuming that the transmission bandwidth for each channel of a television broadcast is 6 MHz and that the frequency bandwidth usable for transmission of television broadcasts is 90~210 MHz, then the number of video channels which can be simultaneously transmitted when using VCOs is about 20 channels. Furthermore, it is difficult to manufacture VCOs which maintain linearity over wide bands.

SUMMARY OF THE INVENTION

The present invention has the object of offering an AM/FM converter which considerably widens the frequency band, and an optical signal transmission system using this AM/FM converter.

The AM/FM converter of the present invention comprises optical frequency modulation means for receiving an electrical signal and outputting an optical-frequency-modulated optical signal beam; and an optical heterodyne detection section, having optical frequency oscillation means for outputting a local oscillator optical beam with an optical frequency separated from that of said optical signal beam by a designated intermediate frequency, optical coupling means for coupling said optical signal beam and said local oscillator optical beam, and a photoelectric converter for obtaining an output as an electrical signal, which receives said optical signal beam and outputs a modulation signal which is frequency-modulated and frequency-converted to said intermediate frequency.

The optical signal transmission system of the present invention comprises an optical transmission device having an AM/FM converter, comprising optical frequency modulation means for receiving an electrical signal and outputting an optical-frequency-modulated optical signal beam, and an optical heterodyne detection section, having optical frequency oscillation means for outputting a local oscillator optical beam with an optical frequency separated from that of said optical signal beam by a designated intermediate frequency, optical coupling means for coupling said optical signal beam and said local oscillator optical beam, and a photoelectric converter for obtaining an output as an electrical signal, which receives said optical signal beam and outputs a modulation signal which is frequency-modulated and frequency-converted to said intermediate frequency; and a transmission means for outputting a transmission optical beam intensity-modulated by the output of said AM/FM converter; an optical transmission path; and an optical receiving device, connected to said optical transmission device via said optical transmission path, comprising a photoelectric converter and frequency-demodulation means for frequency-demodulating the output of said photoelectric converter.

The AM/FM converter and optical signal transmission system of the present invention have the principal feature of applying optical heterodyne detection technology to frequency modulation. As a result, the frequency band which it is able to accept is considerably wider in comparison to conventional systems which use VCOs. For example, when used in a cable television system, it can perform batched frequency-modulation of more AM video signals than are possible with conventional systems using VCOs, with the AM video signals still in a multi-channel state. By using this batched FM modulation technology, the transmission length and number of optical splitters in an optical transmission system are able to be increased.

While the present invention is especially effective when used for transmission of multi-channel video signals, it may be used for transmission of other types of signals as well, resulting is high-quality signal transmissions with little distortion and noise.

BRIEF DESCRIPTION OF THE DRAWINGS

FIGS. 5A and 5B show, by means of the dashed lines, the ratio $P_{FM}/P_{LO}$ between the power $P_{FM}$ of the optical signal beam (FM laser beam) inputted to the photoelectric converter 112-3 shown in FIG. 4 and the power $P_{LO}$ of the local oscillator optical beam (local laser beam) inputted to the photoelectric converter 112-3 shown in FIG. 4, and the relationship between the composite second-order distortion (CSO) and the composite triple-beat distortion (CTB) of the AM video signal when an electrical batched conversion FM signal is demodulated at an output terminal of the in-phase combiner 11B-4. The solid lines indicate the properties of the AM/FM converter shown in FIG. 1B.

FIGS. 15A and 15B are block diagrams respectively showing modification examples of the AM/FM converter 11.

FIGS. 16–19 show examples of combinations of the respective embodiments.

PREFERRED EMBODIMENTS OF THE INVENTION

Figure 1A:
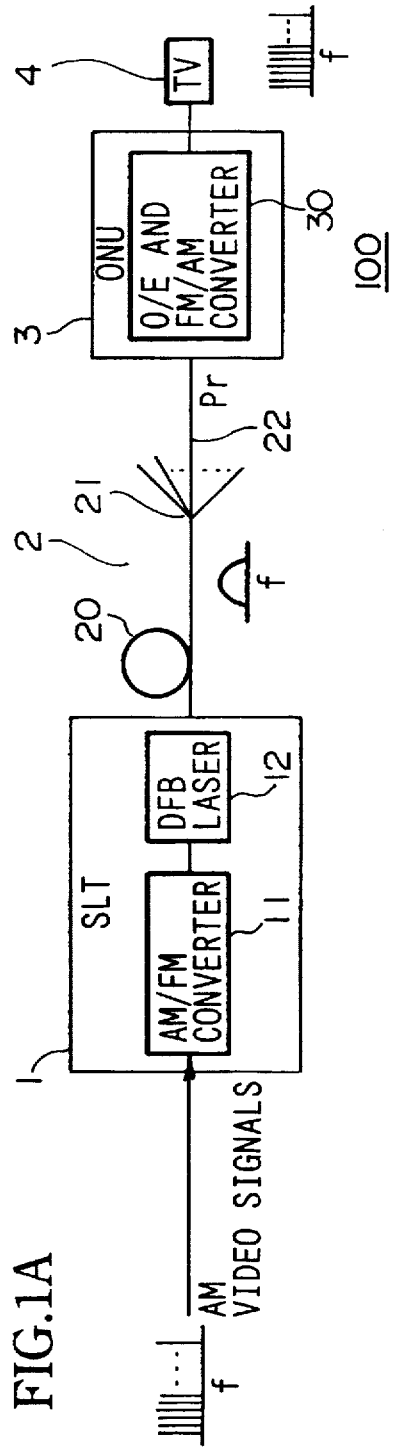
FIG. 1A is an overall view of the structure of an optical signal transmission system according to an embodiment of the present invention.
Figure 1C:
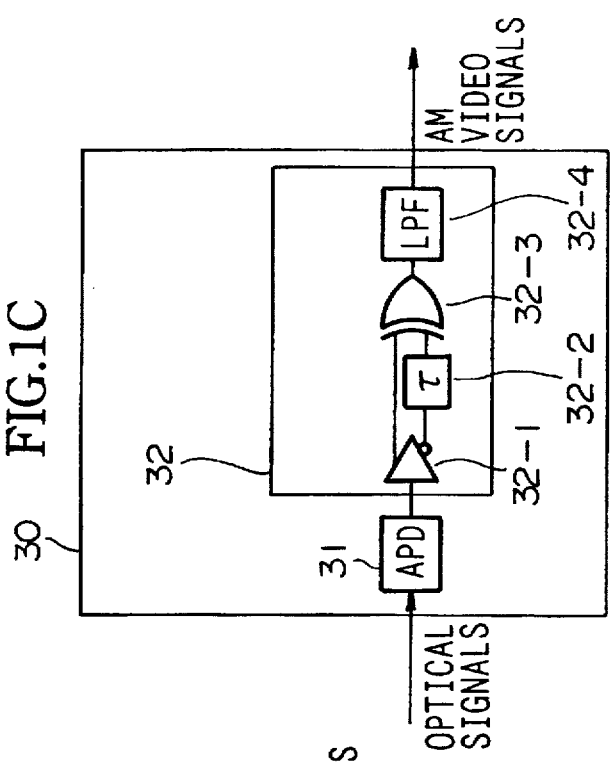
FIG. 1C is a block diagram showing the internal structure of the ONU 3 of FIG. 1A.
Figure 1B:
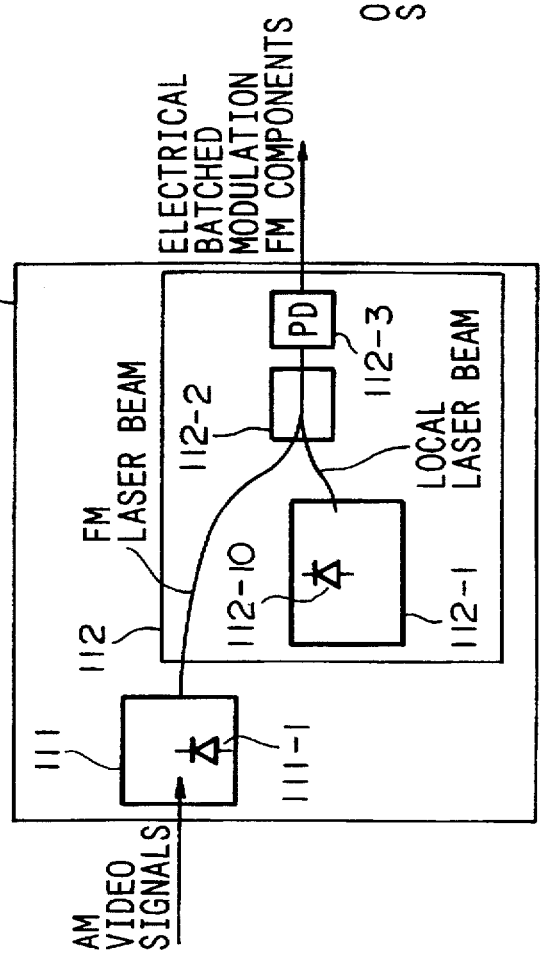
FIG. 1B is a block diagram showing the internal structure of the AM/FM converter 11 of FIG. 1A.

As shown in the structural example of FIGS. 1A through 1C, the optical signal transmission system according to the present invention extracts, by means of optical heterodyne detection, the optical FM modulation component from a semiconductor FM laser beam modulated by a wideband AM input signal, in the form of an electrical FM modulation component which is then sent over an optical transmission path by intensity-modulating a transmitting optical source. FIG. 1A is a diagram showing the overall structure of the optical signal transmission system 100. The optical signal transmission system 100 comprises an SLT (subscriber line terminal) 1, an optical transmission path 2, an ONU (optical network unit) 3 and a television receiver 4. The television receiver 4 which receives AM video signals outputted from the ONU 3 may be replaced by other devices such as a video tape recorder having a receiving section. Furthermore, another possible embodiment of the optical signal transmission system of the present invention may have a structure such as not to include a television receiver 4. This type of optical signal transmission system is described in "Optical Super Wide-Band FM Modulation Scheme and Its Application to Multi-Channel AM Video Transmission Systems", International Conference on Integrated optics and Optical Fibre Communication, IOOC-95, Jun. 26–30, 1995, Technical Digest, volume 5—Postdeadline Papers, authored by the present inventors.

The SLT 1 shown in FIG. 1A comprises an AM/FM (amplitude modulation/frequency modulation) converter 11 and a DFB (distributed feedback) laser 12. The SLT 1 is inputted with frequency-division-multiplexed multi-channel AM video signals, which are converted into FM video signals in batches. The converted multi-channel video signals are sent over the optical transmission path 2 as intensity-modulated optical transmission signals. The optical transmission path 2 transmits optical signals using a passive-double-star (PDS) topology allowing one-to-many communications, by the use of an optical fiber 20, an optical star coupler 21, and a plurality of optical fibers 22 connected to the branched output of the optical star coupler 21. The ONU 3 receives the optical signals transmitted through the optical transmission path 2, and converts them into electrical signals and demodulates them by means of an optical/electrical and FM/AM converter 30, to output them as AM video signals. The television receiver 4 receives the AM video signals outputted from the ONU 3 and display images from an arbitrary channel selected by a user from among a plurality of channels.

FIG. 1B is a block diagram showing the internal structure of the AM/FM converter of FIG. 1A. The AM/FM converter 11 comprises an optical frequency modulation section 111 and an optical heterodyne detection section 112. The optical frequency modulation section 111 includes a semiconductor FM laser 111-1. The optical heterodyne detection section 112 has an optical frequency local oscillator 112-1 composed of a semiconductor local laser 112-10, and optical coupler 112-2, and an optical/electrical converter 112-3 composed of a PD (photodiode). The optical/electrical and FM/AM converter 30 comprises a photoelectric converter 31 composed of an APD (avalanche photodiode), and an FM demodulation section 32, as shown in FIG. 1C. The FM demodulation section 32 uses an inversion/non-inversion amplifier 32-1, a delay line 32-2, a XOR circuit 32-3 and a low-pass filter 32-4 in order to demodulate FM electrical signals, converted into electrical signals by the photoelectric converter, to form AM electrical signals by means of delayed detection.

According to the above structure, with the optical signal transmission system shown in FIG. 1A, frequency-division-multiplexed multi-channel Am video signals are inputted into the SLT 1, and the semiconductor FM laser 111-1 is FM-modulated by these input signals. The optical heterodyne detection section 112 uses the optical frequency local oscillator 112-1 and the optical coupler 112-2 to extract, by means of optical heterodyne detection, the optical frequency modulation components from the output of the semiconductor FM laser 111-1 modulated by the wide-band AM input signals, and converts them into electrical signals using the photoelectric converter 112-3 in order to output them as electrical batched FM modulation components. Then, the transmitting optical source with the DFB laser 12 is intensity-modulated by the electrical batched FM modulation components, and the intensity-modulated optical signals are transmitted to the optical transmission path 2. On the receiving end, the optical transmission signals transmitted through the optical transmission path 2 are received at the ONU 3 and converted into electrical signals by the photoelectric converter 31. Then, they are demodulated into AM video signals by means of delayed detection at the FM demodulation section 32.

Figure 2A:
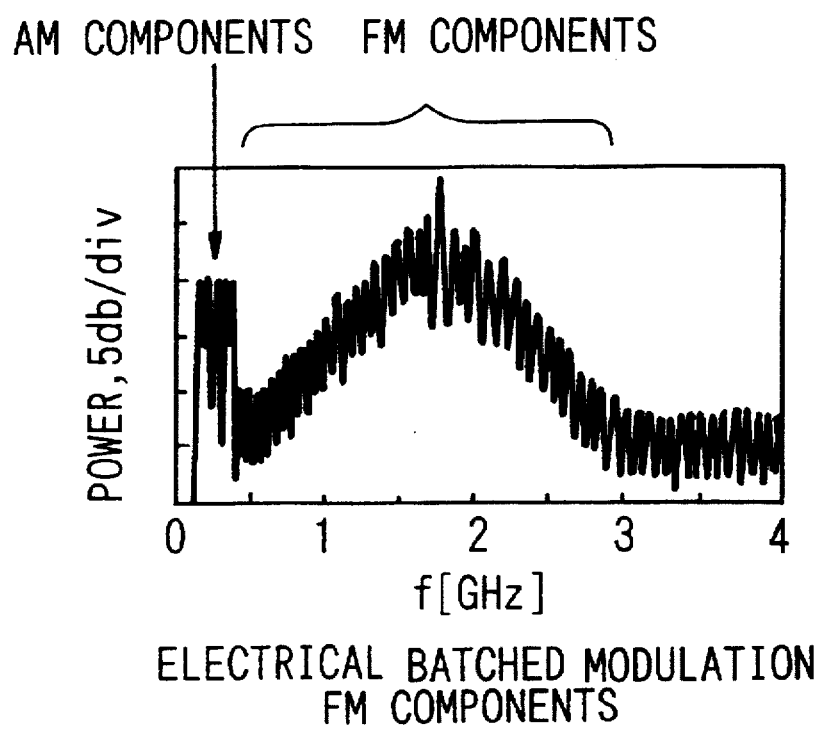
FIG. 2A shows an example of the spectrum of an electrical batched FM modulation component obtained as an output of the optical heterodyne detection section 112 shown in FIG. 1B.
Figure 2B:
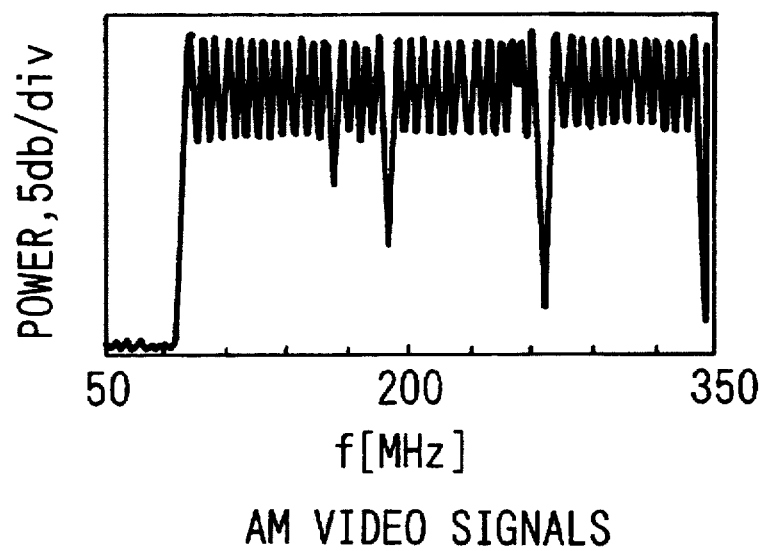
FIG. 2B shows the spectrum of a demodulated multi-channel AM video signal demodulated in batches by the FM demodulation section 32 shown in FIG. 1C.

FIG. 2A shows an example of a spectrum of the electrical batched FM modulation component obtained as an output of the optical heterodyne detection section 112. FIG. 2B shows the spectrum of a demodulated multi-channel Am video signal demodulated in batches by the FM demodulation section 32. In FIG. 2A, the central frequency, i.e. the intermediate frequency, of the electrical batched FM modulation components is 1.75 GHz. In FIG. 2B, a 40 channel AM video signal has been demodulated.

By applying the optical signal transmission system according to the structures shown in FIGS. 1A through 1C to cable television systems, it is possible to perform a batched conversion of an AM video signal, having tens of channels, into a single FM signal, send it over an optical transmission path, and perform a batched demodulation of this FM transmission signal by means of a delayed detection to obtain a multi-channel AM video signal on the receiving end.

The CNR (carrier-to-noise ratio) for demodulation of the output signal into an AM video signal at the output terminal of the optical/electrical and FM/AM converter 30 in the ONU 3 (that is, the output terminal of the FM demodulation section 32) shown in FIGS. 1A through 1C clearly depends upon the number of transmitted channels. While the CNR can be improved by reducing the number of channels, it is preferable that the CNR be improved without reducing the number of channels. The way in which the present invention improves the CNR without reducing the number of channels will be explained below.

Figure 3A:
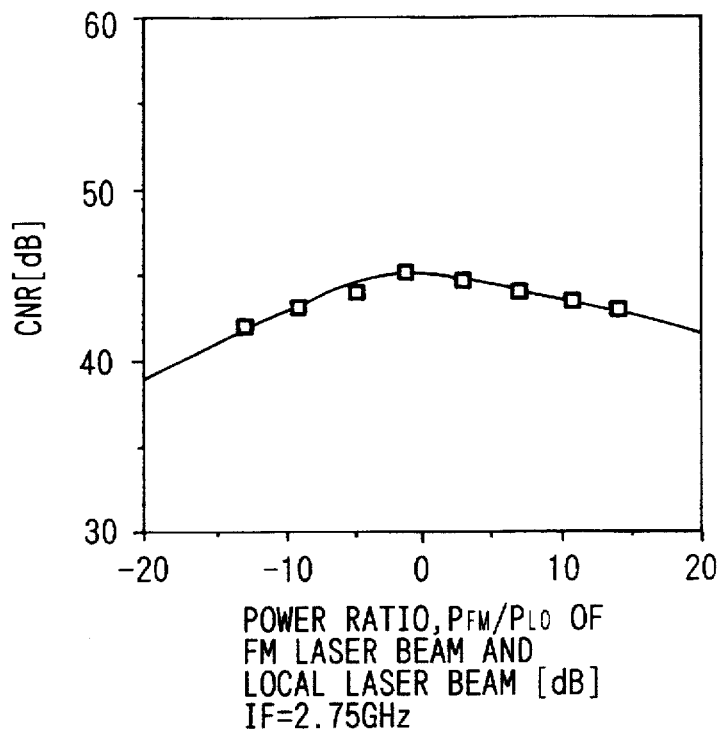
FIGS. 3A and 3B show the ratio $P_{FM}/P_{LO}$ between the power $P_{FM}$ of the optical signal beam (FM laser beam) inputted to the photoelectric converter 112-3 shown in FIG. 1B and the power $P_{LO}$ of the local oscillator optical beam (local laser beam) inputted to the photoelectric converter 112-3 shown in FIG. 1B, and the carrier-to-noise ratio (CNR) relationship when a modulation signal is demodulated into an AM video signal at an output terminal of the AM/FM converter 11.
Figure 3B:
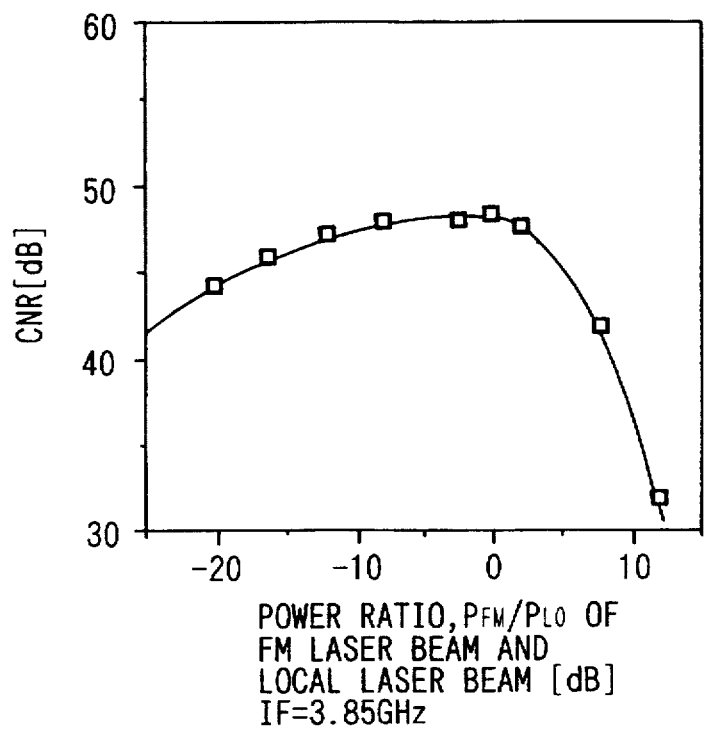

FIGS. 3A and 3B show the ratio $P_{FM}/P_{LO}$ between the power PFM of the optical signal beam (FM laser beam) inputted to the photoelectric converter 112-3 shown in FIG. 1B and the power $P_{LO}$ of the local oscillator optical beam (local laser beam) inputted to the photoelectric converter 112-3 shown in FIG. 1B, and the CNR relationship when a modulation signal is demodulated into an AM video signal at an output terminal of the AM/FM converter 11. Here, FIG. 3A shows the measured values are for the case wherein the central frequency, i.e. the intermediate frequency, of the FM signal spectrum is 2.75 GHz, and FIG. 3B shows the measured values for the case of 3.85 GHz. Both show the transmission characteristics for 20 channels. Additionally, the frequency deviations Δf per channel when the intermediate frequencies are 2.75 GHz and 3.85 GHz are respectively 220 MHz$_{0-p}$/ch and 280 MHz$_{0-p}$/ch.

As shown in these diagrams, the CNR of the AM video signal depends upon the value of the ratio $P_{FM}/P_{LO}$ between the power $P_{FM}$ of the FM laser beam and the power $P_{LO}$ of the local laser beam. Furthermore, the relationship between the CNR and the power ratio $P_{FM}/P_{LO}$ varies with the value of the intermediate frequency. Additionally, FIGS. 3A and 3B indicate that the CNR has a maximum at an optical power ratio of around 0 dB. Therefore, a designated CNR can be obtained by controlling the ratio $P_{FM}/P_{LO}$ between the power PFM and the power $P_{LO}$ within a designated range.

At present, the transmission quality standard for CNR in coaxial cable television is 42 dB or higher. Additionally, with regard to controlling the power ratio $P_{FM}/P_{LO}$ in actual practice, the initial production deviations for the power $P_{FM}$ of the FM laser beam and the power $P_{LO}$ of the local laser beam must both be held to about ±4 dB from the designed value. Therefore, under consideration of the properties shown in FIGS. 3A and 3B based on these conditions, the $P_{FM}/P_{LO}$ ratio should preferably be held to $-8 < P_{FM}/P_{LO} < 8$ [dB] in order to obtain CNR characteristics which allow for stable quality and fulfill the transmission quality standard of 42 dB or higher.

Next, other embodiments of the AM/FM converter 11 of the optical signal transmission system according to the present invention shown in FIGS. 1A and 1B will be explained with reference to FIGS. 2A and 4–8. At the optical frequency modulation section 111 shown in FIG. 1B, an optical frequency modulation is applied to the FM laser beam outputted from the FM laser 111-1 composed of a semiconductor laser, by varying the input electrical current depending on the input signals. However, an optical intensity modulation is applied to the FM laser beam by variations in the input electrical current, so the optical heterodyne output contains Am modulation components mixed in with the FM modulation components, as shown in the electrical batched FM modulation signal spectrum shown in FIG. 2A. Additionally, the FM modulation components should most preferably have a spectrum which is symmetric with respect to the intermediate frequency (1.75 GHz in the example of FIG. 2A). However, in actual practice, the FM laser beam is intensity-modulated along with the frequency modulation, so that the spectrum is made asymmetrical. Additionally, there are fluctuations in the amplitudes of the FM laser beam and the local laser beam, and these fluctuations cause distortion and noise upon demodulation at the FM demodulation section 32, so that they may result in degradation of the video picture quality. Furthermore, fluctuations in the optical frequency of the FM laser beam and fluctuations in the optical frequency of the local laser beam also form noise upon demodulation at the FM demodulation section 32, so that these may also result in degradation of the video picture quality. The following embodiments of the present invention are provided to overcome these problems, and allow high quality signal transmissions with less distortion and noise.

Figure 4:
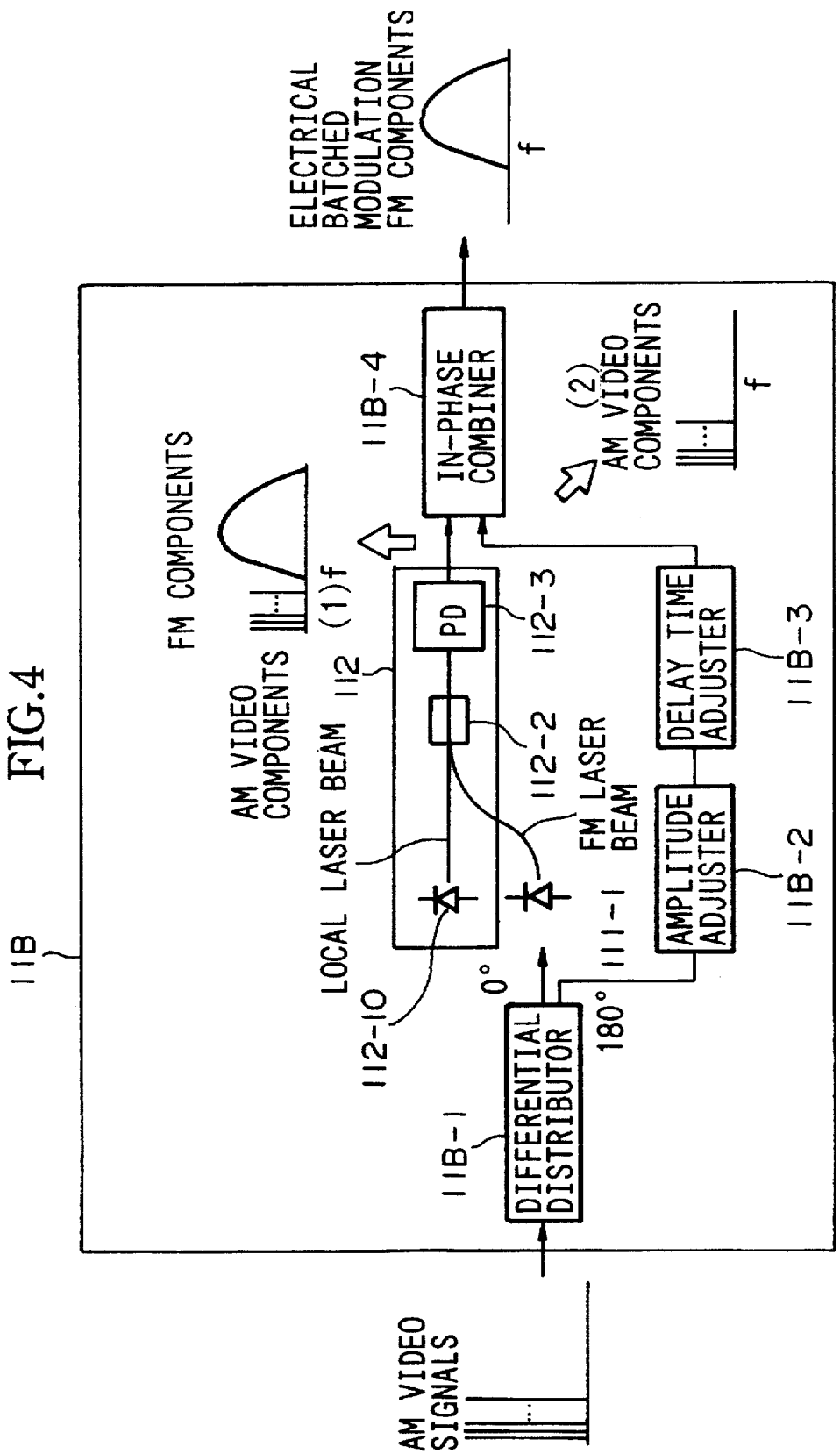
FIG. 4 shown another embodiment of the AM/FM converter according to the present invention.

FIG. 4 shows another embodiment of the AM/FM converter 11 of the present invention as shown in FIG. 1A. In FIG. 4, the elements which are identical to those shown in FIGS. 1A and 1B are denoted by the same reference numerals. In the following description as well, the same elements have been given the same reference numerals. The AM/FM converter 11B shown in this drawing has been additionally provided with a differential distributor 11B-1 which distributes input AM video signals after changing their phase by 180°, an amplitude adjuster 11B-2 which adjusts the amplitudes of electrical signals from one of two outputs of the differential distributor 11B-1, a delay time adjuster 11B-3 which applies a delay to the output electrical signals of the amplitude adjuster 11B-2, and an in-phase combiner 11B-4 which combines in phase the output electrical signals of the delay time adjuster 11B-2 and the electrical batched FM modulation components based on the other output of the differential distributor 11B-1. At the AM/FM converter 11B, the differential distributor 11B-1 distributes AM video signals into opposite phases of 0° and 180°. One of the outputs (0° phase) is inputted to the FM laser 111-1 and its output is supplied to the optical heterodyne detection section 112. The optical heterodyne detection section 112 detects the inputted optical signals by means of optical heterodyning, converts them into electrical signals with the PD 112-3, and outputs frequency-modulated signals. The electrical signals outputted by the PD 112-3 and the electrical signals from the other output of the differential distributor 11B-1 (180° phase) are combined in phase by the in-phase combiner 11B-4. The electrical signals inputted to the in-phase combiner 11B-4 from the 180° phase side at this time are amplitude-adjusted by the amplitude adjuster 11B-2 and delay-adjusted by the delay time adjuster 11B-3 such that they are given the same amplitude and opposite phase with respect to the AM modulation components of the optical frequency modulation signal beams. Therefore, the AM modulation components of the signals inputted to the in-phase combiner 11B-4 are cancelled in the in-phase combiner 11B-4. The output spectrum of the output of PD 112-3 is shown in (1) and the output spectrum of the delay time adjuster is shown in (2). While the structure in this case was such that opposite phase components were distributed and an in-phase combination was performed, the structure may be modified so as to distribute in-phase and perform a differential combination. This modification is also possible with the structural examples of FIGS. 7 and 10 to be explained.

Next, the ratio $P_{FM}/P_{LO}$ between the power $P_{FM}$ of the optical signal beam (FM laser beam) inputted to the photoelectric converter 112-3 shown in FIG. 4 and the power $P_{LO}$ of the local oscillator optical beam (local laser beam) inputted to the photoelectric converter 112-3 shown in FIG. 4, and the relationship between the composite second-order distortion (CSO) and the composite triple-beat distortion (CTB) of the AM video signals when electrical batched conversion FM signals are demodulated at the output terminal of the in-phase combiner 11B-4, will be explained with reference to FIGS. 5A and 5B. FIG. 5A shows the measured values for the case wherein the central frequency, i.e. the intermediate frequency, of the FM signal spectrum is 2.75 GHz, while FIG. 5B shows the case for 3.85 GHz. Both show the transmission characteristics for 20 channels. In FIGS. 5A and 5B, the solid lines indicate the characteristics of the AM/FM converter 11 shown in FIG. 1B, while the dashed lines indicate the characteristics of the AM/FM converter 11B shown in FIG. 4. The frequency deviations $\Delta f$ per channel when the intermediate frequencies are 2.75 GHz and 3.85 GHz are respectively 220 MHz$_{0-p}$/ch and 280 MHz$_{0-p}$/ch. By removing the AM components, the structure of FIG. 4 allows the CSO to be improved without changing the $P_{FM}/P_{LO}$ values as indicated by the arrow in FIG. 5A. Additionally, both the CSO and CTB can be improved without changing the $P_{FM}/P_{LO}$ values as shown by the arrows in the case of FIG. 5B. Consequently, the CNR and distortion (CSO and CTB) are both able to be improved by removing the AM components and controlling the designated range of the optical power ratio.

Figure 6:
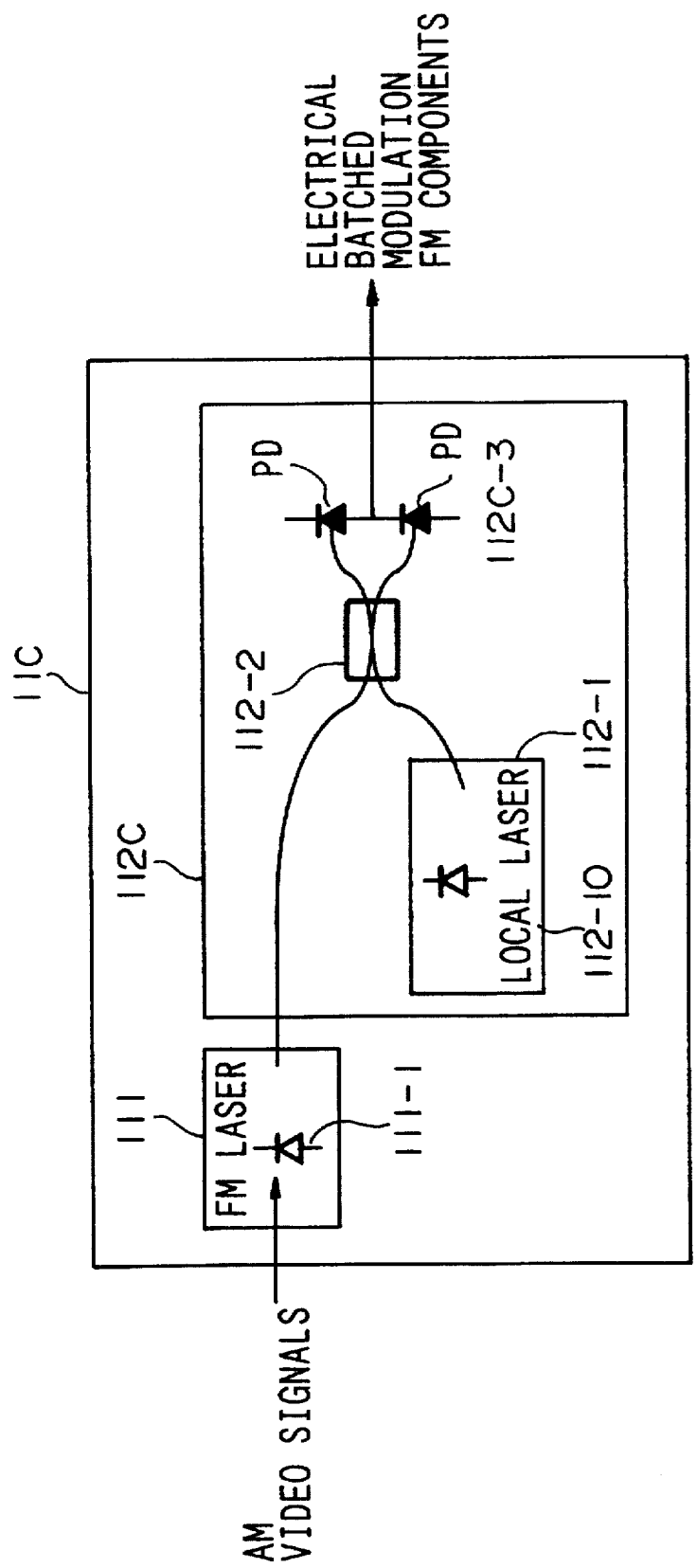
FIGS. 6 through 8 respectively show other embodiments of the AM/FM converter according to the present invention.

FIG. 6 shows another embodiment which removes AM components in a manner similar to the AM/FM converter 11B as explained with reference to FIG. 4. With the AM/FM converter 11C of FIG. 6, the optical heterodyne detection section 112C has a photoelectric converter with a balanced receiver configuration. In the optical heterodyne detection section 112C, the photoelectric converter 112C-3 is formed from two PDs having matching characteristics, and the optical pathlength from the optical coupler 112-2 to each of the PDs is identical. In this case, the photoelectric converter 112C-3 receives the intensity modulation components in phase and receives the frequency modulation components with opposite phase. Since the photoelectric converter 112C-3 is structured so that the polarities of the two PDs are opposite each other, the intensity modulation components are cancelled and the frequency modulation components are added.

One property of the balanced receiver configuration is that the intensity fluctuations of the local laser beam can be cancelled in addition to the intensity fluctuations of the FM laser beam. Another property is that both outputs of the optical coupler 112-2 are able to be used. As a result, the optical power is able to be used effectively because the frequency modulation components are added together as mentioned above. The balanced receiver configuration is explained in detail, for example, in Kiyoshi Nosu, Katsushi Iwashita, Nori Shibata, Masao Kawachi, Hiromu Toba, Osamu Ishida, Takeshi Ito, and Kyo Inoue, "Coherent Lightwave Communications Technology", pp. 76–79, Chapman & Hall, London, 1995.

Comparing the structure of FIG. 4 with the structure of FIG. 6, the structure of FIG. 4 has the advantage of being less expensive than the structure of FIG. 6 which uses a balanced receiver. This is because the electrical components such as the differential distributor 11B-1, the amplitude adjuster 11B-2, and the delay time adjuster 11B-3 can all be operated at the frequencies of the multi-channel video signals, such as more than 0 MHz and less than 350 MHz, so they are cheap. On the other hand, the balanced receiver requires two identical photoelectric converters (PDs) which can operate at high frequencies, so that it is comparatively expensive. In conventional optical signal transmission systems, the optical transmitting section (in this case, the SLT 1 of FIG. 1A) and the optical receiving section (the ONU 3 of FIG. 1A) are arranged apart and separated by a long optical transmission path. For example, when considering the case wherein the input to the FM laser 111-1 is distributed as in FIG. 4 and one of the divided AM modulation components is sent directly to an optical receiving section which is provided far away in contrast with that of FIG. 4, the number of devices increases and it becomes necessary to install a separate optical transmission path for the AM modulation components. Conventionally, the balanced receiver configuration is used in this type of case because of the need to process only the optical signals which have been sent through a long optical path to the optical receiving section in order to perform optical heterodyne detection. The structure of FIG. 4 is able to be used in the present invention because the FM laser 111-1 and the elements 112-10, 112-2, and 112-3 of the optical heterodyne detection section 112 are provided within the SLT 1 and are spaced close together, and the electrical signals divided from the input to the FM laser 111-1 and the output electrical signals from the optical heterodyne detection section 112 are able to be combined with a simple structure. For this reason, it has the advantage that the structure is cheaper than that using a balanced receiver. On the other hand, the advantage of the structure using a balanced receiver as in FIG. 6 is that the intensity components of the local laser can be cancelled in addition to those of the FM laser. However, with regard to this point, if the distance between the FM laser 111-1 and the PD 112-3 is comparatively short, the local oscillator power (the output of the local laser 112-2) can be reduced even with the structure of FIG. 4, so that the influence of intensity fluctuations of the local laser beam are able to be minimized.

Figure 7:
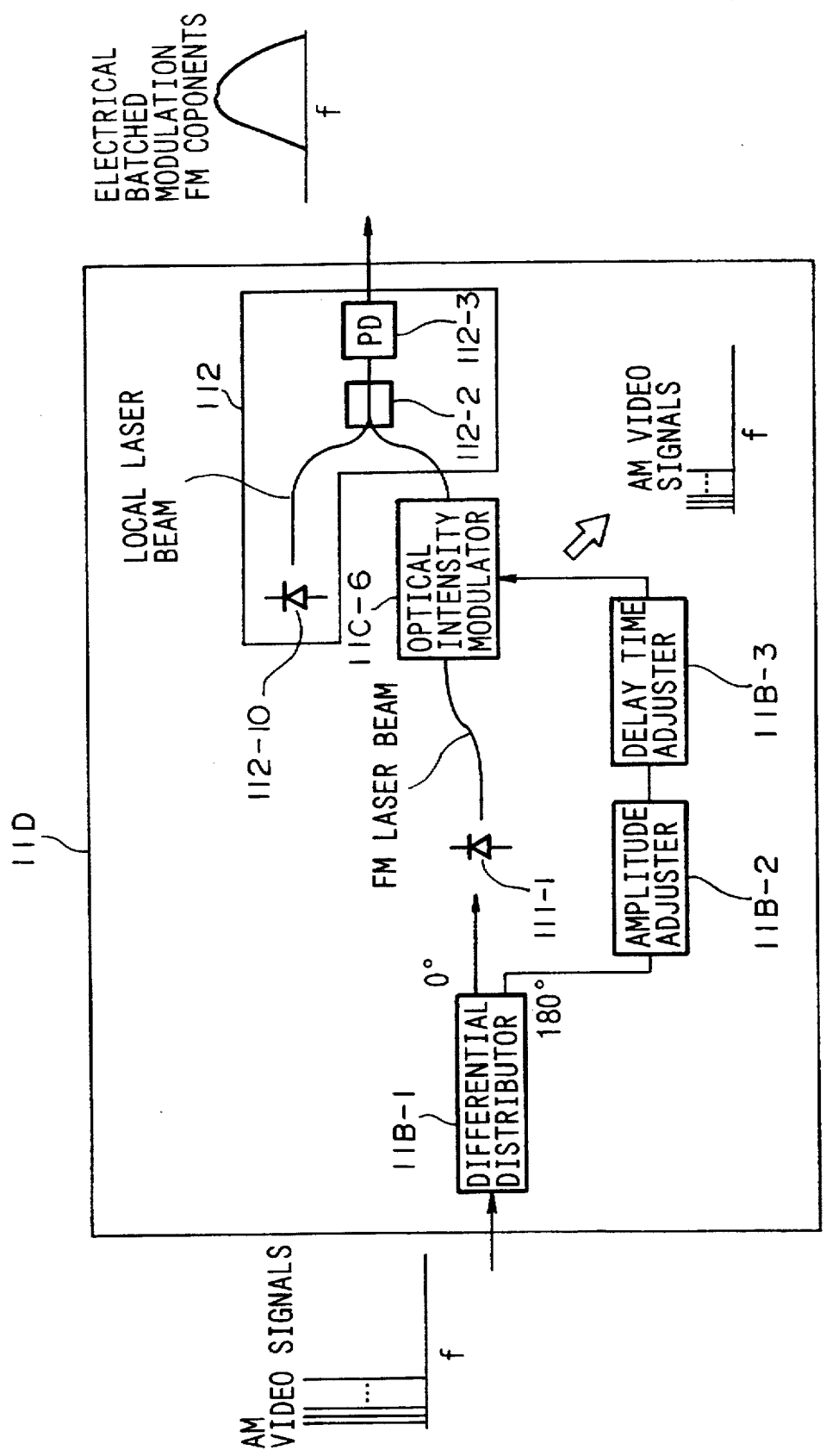

FIG. 7 shows another example of a modification to the AM/FM converter 11B of FIG. 4. In addition to the differential distributor 11B-1, the amplitude adjuster 11B-2, the delay time adjuster 11B-3 and the optical heterodyne detection section 112 of the AM/FM converter 11B shown in FIG. 4, the AM/FM converter 11D of FIG. 7 also has an optical intensity modulator 11C-6 which intensity-modulates the FM laser beam based on the output of the delay time adjuster 11B-3. In this example, the input of the FM laser 111-1 is split into two parts of 0° and 180° phase by the differential distributor 11B-1, and the optical signal on the 0° side is intensity-modulated by using the signal from the 180° side in order to cancel the AM modulation components.

Figure 8:
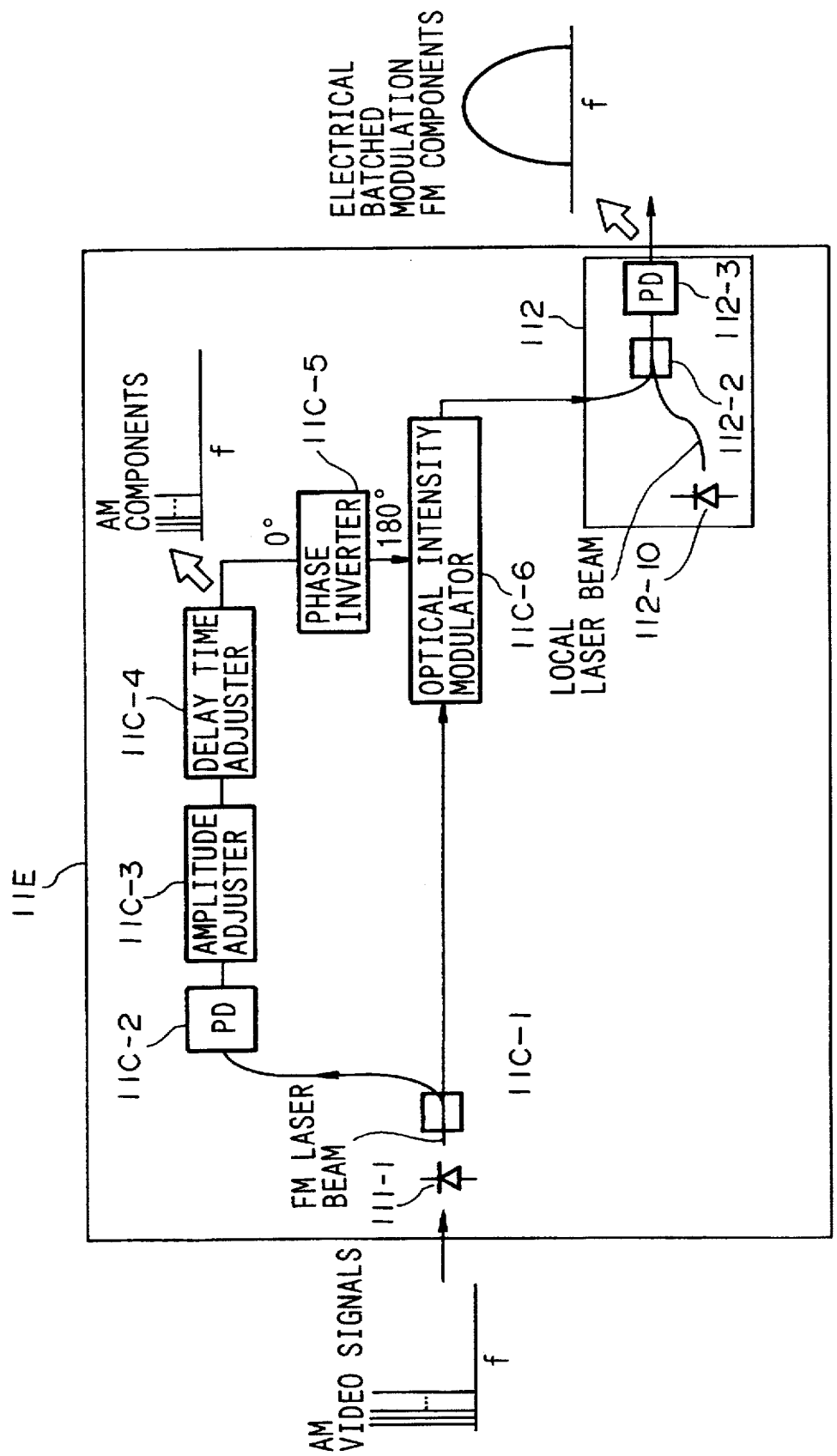

FIG. 8 is a block diagram showing an example of another modification to the AM/FM converter 11B shown in FIG. 4. The AM/FM converter 11E of FIG. 8 is provided with an optical beam splitter 11C-1 which splits the output of the FM laser 111-1 into two parts, a PD 11C-2 which converts one of the output beams from the optical beam splitter 11C-1 into electrical signals, an amplitude adjuster 11C-3 and a delay time adjuster 11C-4 which adjust the amplitude and delay time of the output electrical signals, a phase inverter 11C-5 which inverts the output of the delay time adjuster 11C-4, and an optical intensity modulator 11C-6 which intensity-modulates the other output beam from the beam splitter 11C-1 with the output of the phase inverter 11C-5. Then, the output optical beam from the optical intensity modulator 11C-6 is detected by the optical heterodyne detection section 112 to obtain electrical batched FM modulation components.

With the AM/FM converter 11E shown in FIG. 8, an optical frequency modulation optical signal beam modulated by input AM video signals is split into two optical beams by the optical beam splitter 11C-1. One part is inputted to the optical intensity modulator 11C-6, while the other beam, after conversion to an electrical signal be means of the PD 11C-2, is ultimately inputted to the optical intensity modulator 11C-6 with opposite phase in order to intensity-modulate the other output beam of the beam splitter 11C-1, thereby cancelling the AM modulation component of the output beam of the optical intensity modulator 11C-6. At this time, the amplitude adjuster 11C-3 and the delay time adjuster 11C-4 adjust the amplitude and phase of the electrical signals inputted into the optical intensity modulator 11C-6 in order to cancel the AM modulation component and to make the spectrum of the FM modulation component as symmetric as possible while keeping the intermediate frequency at the center. In the case of FIGS. 7 and 8, the AM modulation components are not cancelled at the output of the photoelectric conversion using the PD as with the structure using a balanced receiver as in FIG. 6 or the structural example of FIG. 4; instead, the cancellation is performed on the transmission beam of the FM laser 111-1. With the structure using a balanced receiver and the structural example of FIG. 4, the AM modulation components and intensity fluctuations cannot be eliminated at the intermediate frequency. In contrast, with the structural examples of FIGS. 7 and 8, the AM modulation components are cancelled in the optical stage, so that the AM modulation components and the FM laser intensity fluctuations can be cancelled over all of the frequencies outputted by the PD. However, the structural examples of FIGS. 7 and 8 have a tendency towards being expensive, since the number of parts increases. Additionally, it cannot cancel local oscillator intensity fluctuations of the local laser 112-10. While a phase inverter 11C-5 was used in the structural example of FIG. 8, inversions may be capable of being performed depending upon the polarity of the PD 11C-2; in that case, a phase inverter 11C-5 is not necessary. This also applies to the structural example of FIG. 12 to be explained below.

Figure 9A:
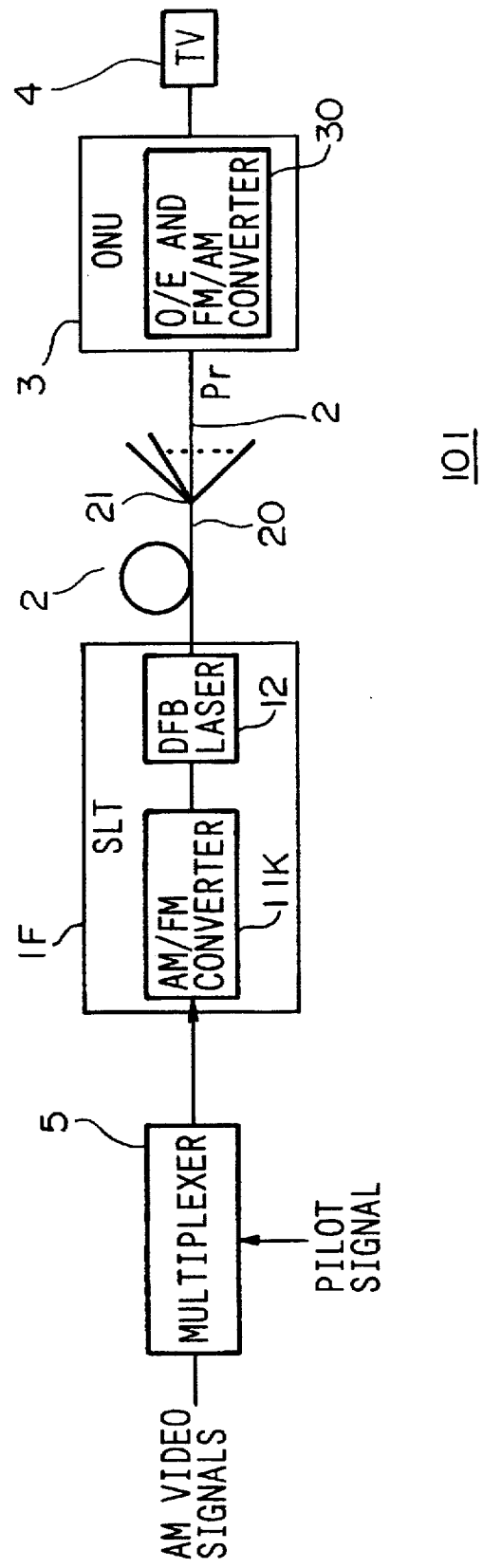
FIGS. 9A and 9B are block diagrams showing another embodiment of an optical signal transmission system according to the present invention.
Figure 9B:
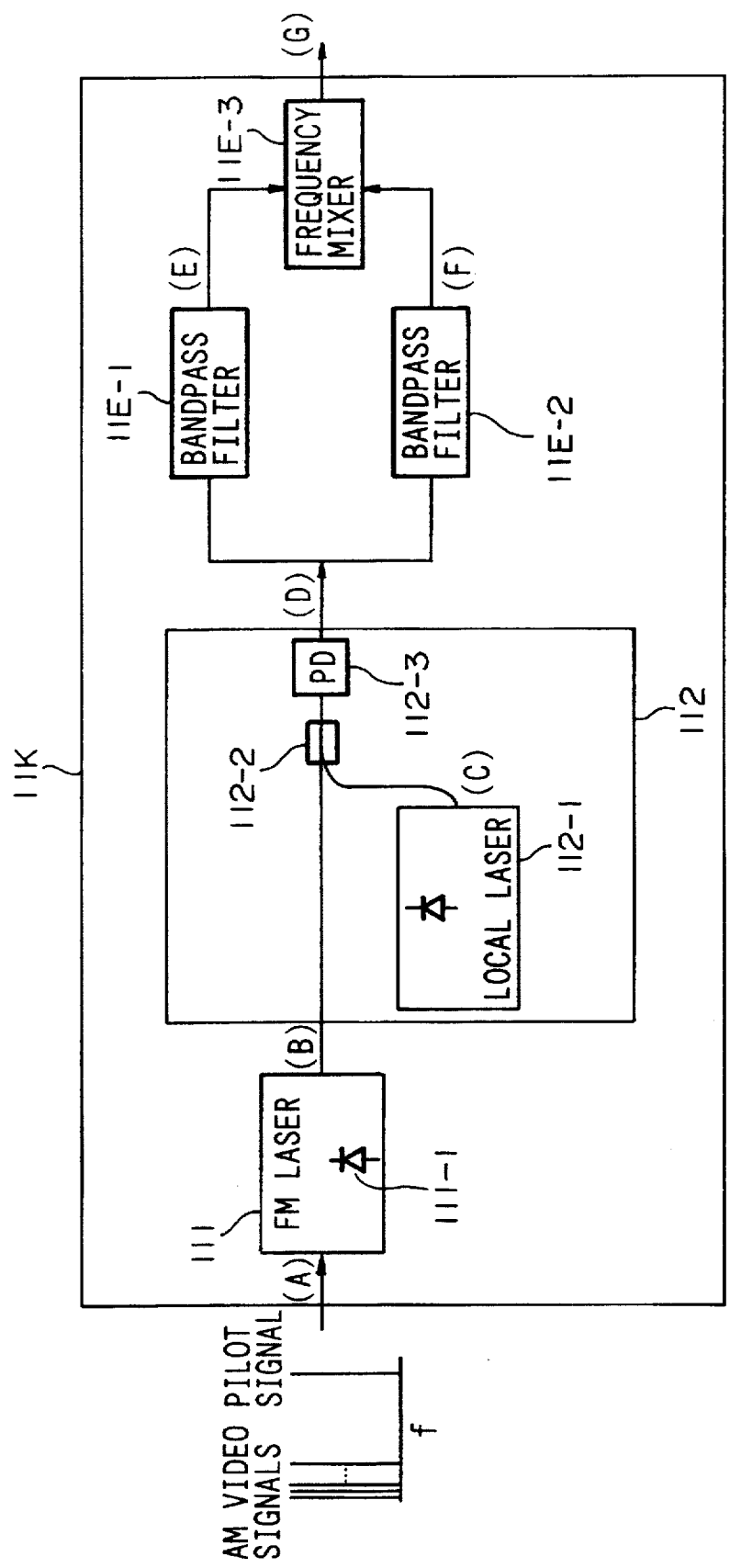

FIGS. 9A and 9B are block diagrams showing another embodiment of an optical signal transmission system according to the present invention. The embodiment of the present invention shown in this diagram allows the noise arising from the semiconductor FM laser frequency fluctuations and the local oscillator laser frequency fluctuations to be eliminated by superimposing a pilot signal onto a wideband AM input signal to modulate a semiconductor FM laser, respectively extracting the FM modulation signal obtained by optical heterodyne detection and the pilot signal by means of the bandpass filters 11E-1 and 11E-2, and frequency-mixing by means of the frequency mixer 11E-3. In comparison to the optical signal transmission system 100 shown in FIG. 1, the optical signal transmission system 101 shown in FIG. 9A is provided with an additional multiplexer 5 which frequency-multiplexes the AM video signals with pilot signals having different frequencies. The output of this multiplexer 5 is inputted to the SLT 1F.

The cancellation of fluctuation components by means of a pilot signal is described in Y. H. Cheng, T. Okoshi, "Phase-noise-cancelling dual-frequency heterodyne optical fibre communication system", Electronics Letters, vol. 25, no. 13, pp. 835–836, 1989.

Hereinbelow, the detailed operation of the AM/FM converter 11K will be explained with reference to FIGS. 13A–13G. FIGS. 13A–13G show the spectra at each of the locations (A) through (G) of the structural examples shown in FIG. 9B as well as FIGS. 10, 11 and 12 to be explained below. The multiplexer 5 shown in FIG. 9A frequency-division-multiplexes the pilot signals with the AM video signals. For example, the output (A) of the multiplexer 5 is an electrical signal wherein an AM video signal of frequency 90 MHz–450 MHz and a pilot signal of frequency fp=2.1 GHz have been frequency-division-multiplexed (see FIG. 13A). The optical frequency modulation section 111 FM-modulates the FM laser 111-1 by means of an input electrical current based on the electrical signal (A) inputted from the multiplexer 5. In the present example, it outputs an optical frequency modulation signal with a central frequency f1 of 193,006.1 GHz (see FIG. 13B). The output (B) of the optical frequency modulation section 111 has fluctuations $\Delta f1$ due to the FM laser 111-1 at the intermediate frequency f1 of the optical frequency modulation signal. Additionally, an optical signal having the frequency components f1±fp (193,004.0 GHz and 193,008.2 GHz) due to the pilot signal is formed. The frequency components f1 ±fp fluctuate with fluctuations $\Delta f1$.

Figure 13A:
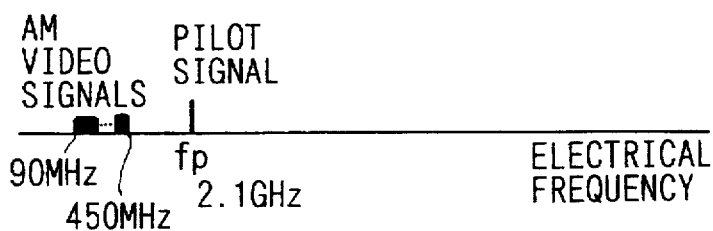
FIGS. 13A through 13G show the spectrum at the respective locations (A) through (G) of the structural examples of the AM/FM converter shown in FIG. 9B and FIGS. 10 through 12.
Figure 13B:
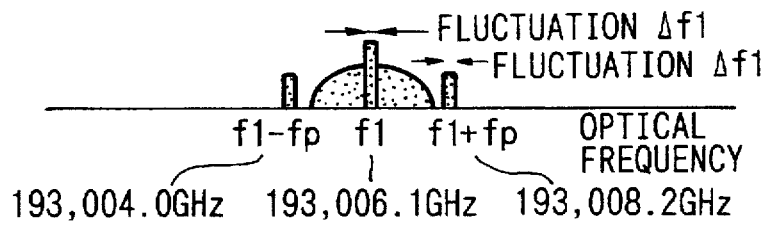
Figure 13C:
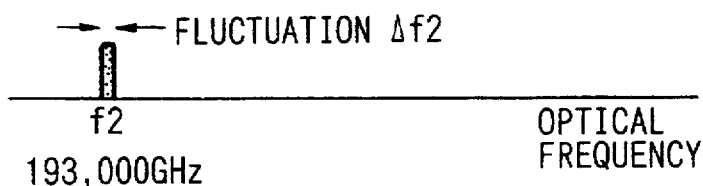
Figure 13D:
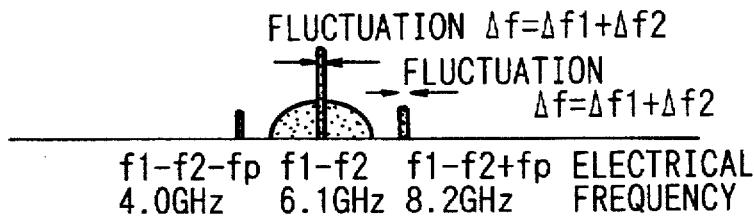

The optical heterodyne detection section 112 is inputted with the optical frequency modulation signal (B) from the optical frequency modulation section 111, and after performing an optical heterodyne detection using a local oscillation beam (C) from the optical frequency local oscillator 112-1 as shown in FIG. 13C, it outputs the detected electrical signal from the photoelectric converter 112-3. FIG. 13D shows the spectrum of the electrical FM batched modulation component (D) outputted from the photoelectric converter 112-3. Since the output of the optical frequency local oscillator 112-1 is a local oscillator beam of oscillation frequency f2=193,000 GHz from the local laser 112-10 which fluctuates with fluctuation $\Delta f2$, the electrical FM batched modulation component (D) has a central frequency f1–f2 which is the central oscillation frequency f1 of the FM laser 111-1 by the local oscillator frequency f2, fluctuating with fluctuations $\Delta f$ ($=\Delta f1+\Delta f2$). Additionally, the electrical FM batched modulation component (D) simultaneously includes frequency components f1–f2±fp due to the pilot signal. In this case, the electrical FM batched modulation component (D) is a signal containing the central frequency f1–f2=6.1 GHz and frequency components f1–f2±fp=8.2 GHz, 4.0 GHz due to the pilot signal.

Figure 13E:
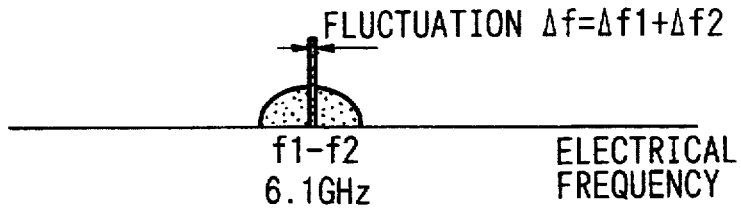
Figure 13F:
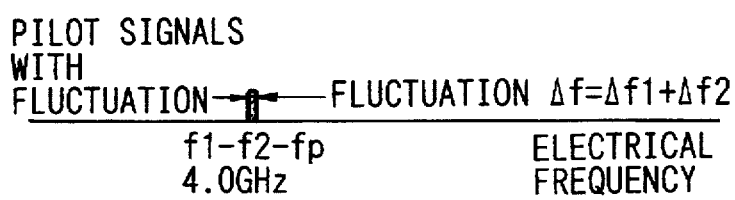
Figure 13G:
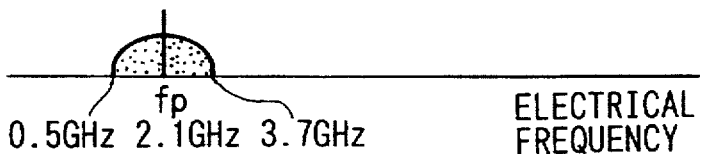

The fluctuations of the optical frequencies of the optical frequency modulation signal beam (B) and the local oscillator beam (C) are converted into fluctuations of the electrical signal (D). Additionally, the electrical frequency fluctuations of the batched FM modulation component and the electrical frequency fluctuations of the pilot signal become the same ($\Delta f=\Delta f1+\Delta f2$). FIG. 13E (E) and FIG. 13F (F) show the results when bandpass filters 11E-1 and 11E-2 are used to extract a single frequency component from the batched FM modulation component (D) and the pilot signal. The fluctuation components can be cancelled by frequency-mixing in order to allow an electrical signal (G) with the frequency fp of the pilot signal as the central frequency from the frequency mixer 11E-3 (see FIG. 13G).

Figure 10:
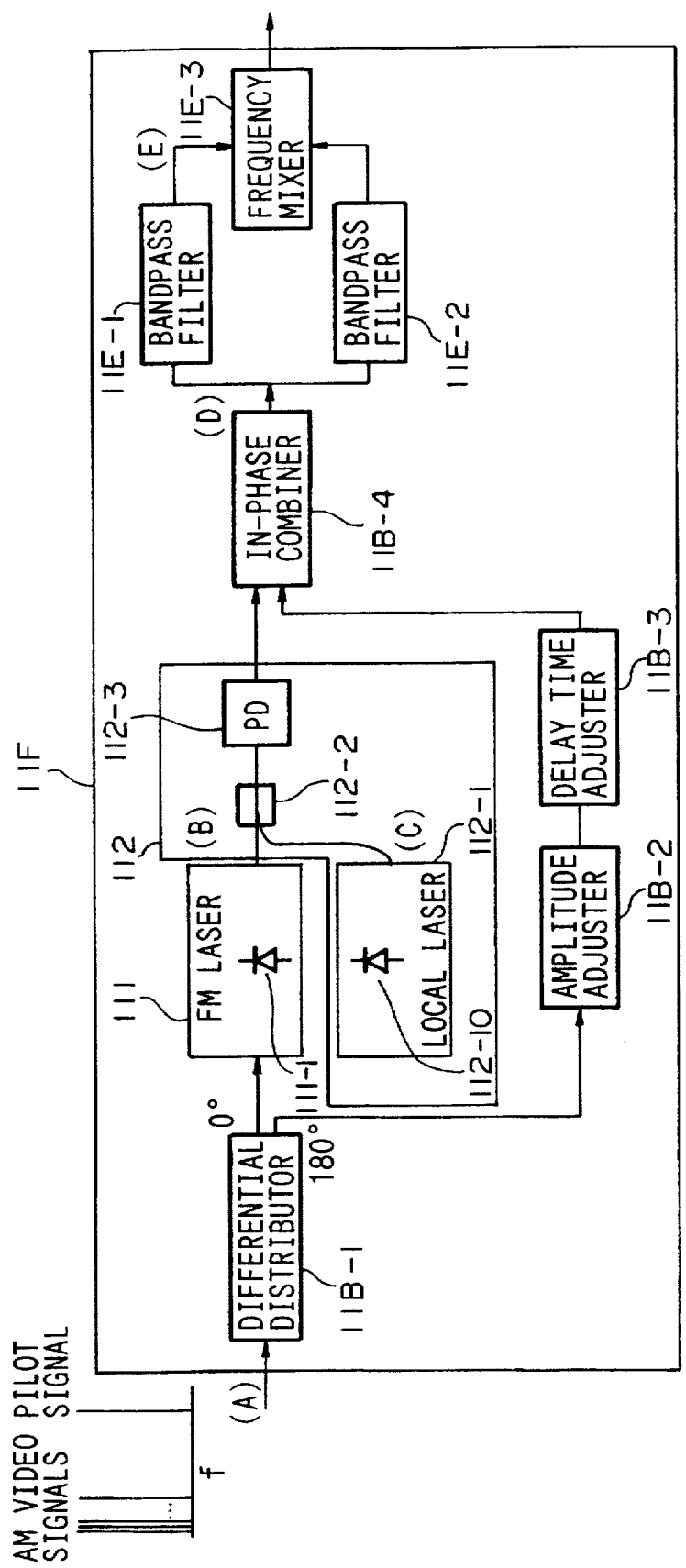
FIGS. 10, 11 and 12 respectively show other embodiments of the AM/FM converter 11K shown in FIG. 9A.

FIG. 10 is a block diagram showing the structure of the AM/FM converter 11K in the SLT 1F of FIG. 9A. At the AM/FM converter 11F, AM video input signals superimposed with pilot signals are distributed with opposite phases of 0° and 180° by means of a differential distributor 11B-1. One of the outputs (0° phase) is inputted into the optical frequency modulation section 111, and the other output (180° phase) is combined in phase with electrical signals outputted from the optical heterodyne detection section 112 by means of the in-phase combiner 11B-4. The in-phase combined output is split into two beams, which are respectively separated into an FM signal modulation component and pilot signals by means of two bandpass filters 11E-1 and 11E-2. The two separated electrical signals are frequency-mixed by means of a multiplier within the frequency mixer 11E-3. When the frequencies are mixed, optical frequency fluctuations of the optical frequency modulation signal beam and the local oscillator beam are able to be cancelled.

With the AM/FM converter 11F of FIG. 10, it is possible to obtain both the effect of eliminating fluctuation components by using the pilot signals, and the effect of cancelling the AM modulation components as with the embodiment shown in FIG. 4.

Figure 11:
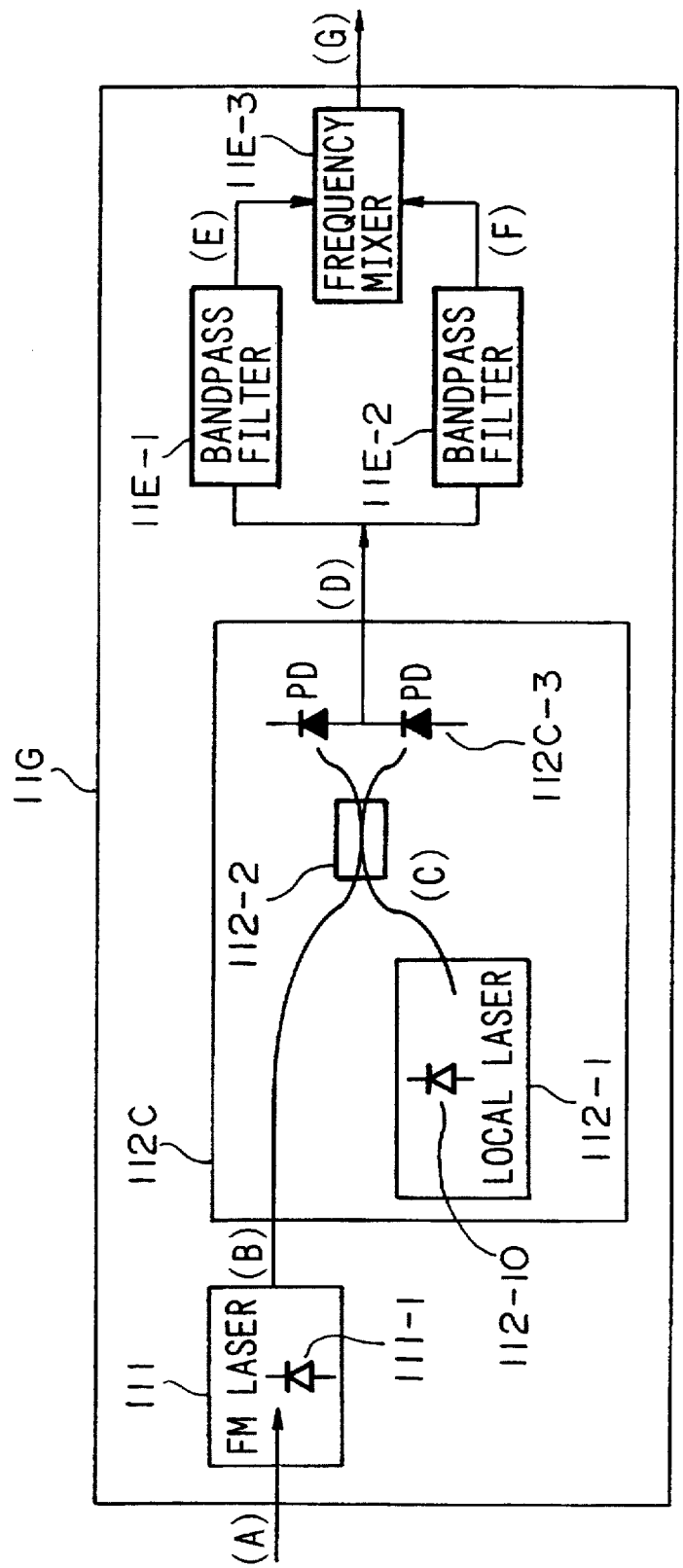

FIG. 11 is a diagram showing another embodiment of the AM/FM converter shown in FIG. 9A. The AM/FM converter 11G of FIG. 11 has an optical frequency modulation section 111 and an optical heterodyne detection section 112C having structures identical to those of the AM/FM converter 11C shown in FIG. 6, and also includes a bandpass filter 11E-1 for extracting FM modulation signal components, a bandpass filter 11E-2 for extracting pilot signal components, and a frequency mixer 11E-3 for mixing their outputs. At the AM/FM converter 11G, the FM laser 111-1 is modulated by an electrical signal wherein the AM video input signal is superimposed with a pilot signal. An optical heterodyne detection is performed by means of the balanced receiver 112C-3, and the detection output is split into two parts and separated into an FM signal modulation component and a pilot signal by means of the two bandpass filters 11E-1 and 11E-2. These two separated electrical signals are mixed by means of the frequency mixer 11E-3 in order to cancel the optical frequency fluctuations between the optical frequency modulation signal and the local oscillator signal.

Figure 12:
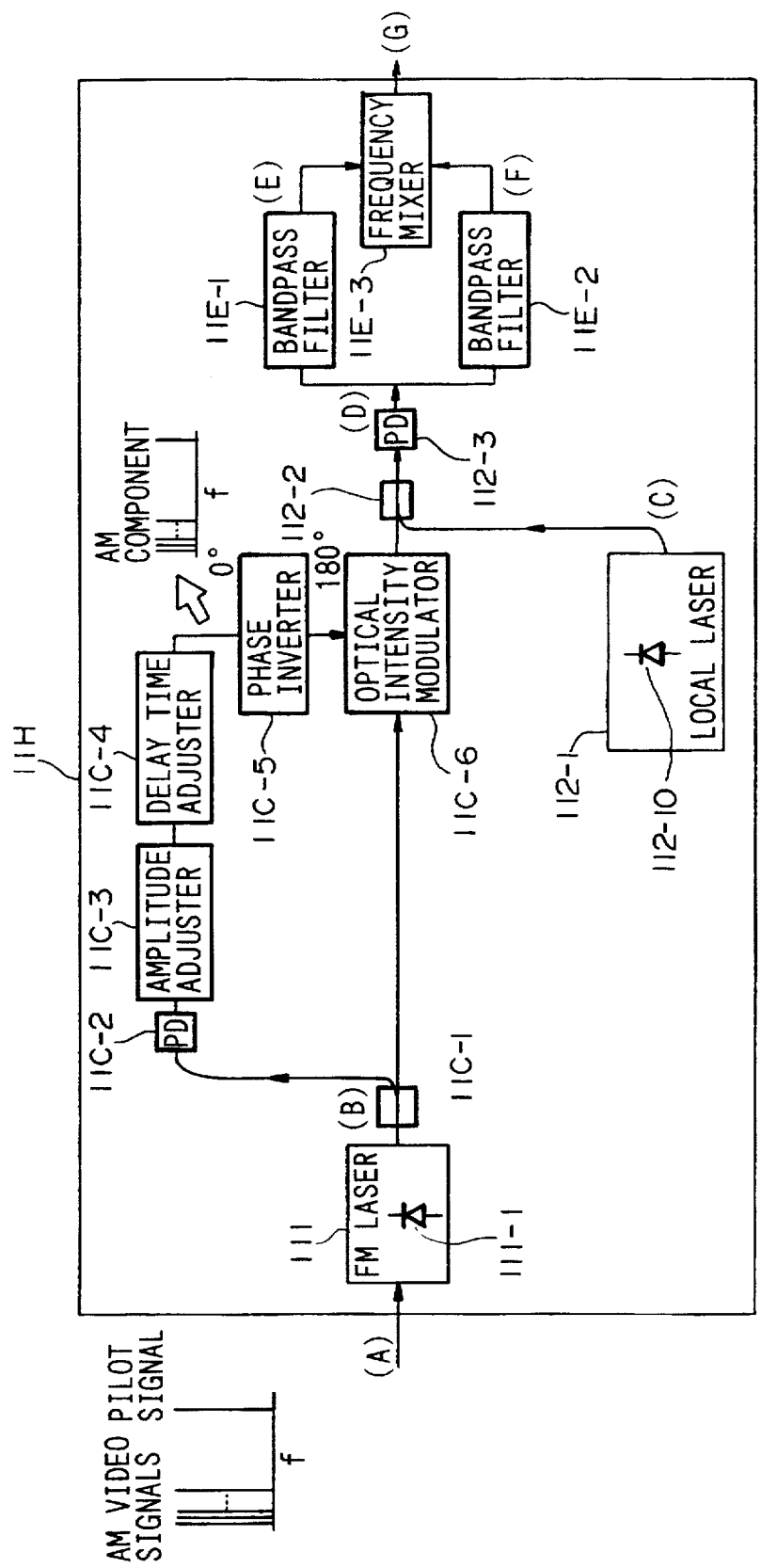

FIG. 12 is a diagram showing another embodiment of the AM/FM converter 11K shown in FIG. 9A. The AM/FM converter 11H shown in FIG. 11 modulates the FM laser 111-1 with an electrical signal wherein the AM video input signal has been superimposed by a pilot signal. The optical frequency modulated optical signal beam outputted from the FM laser 111-1 is split into two parts by the beam splitter 11C-1. One part is inputted into the optical intensity modulator 11C-6, while the other part is converted into an electrical signal by the PD 11C-2, propagates through the amplitude adjuster 11C-3, the delay time adjuster 11C-4 and the phase inverter 11C-5, then in inputted into the optical intensity modulator 11C-6 with opposite phase. The AM modulation component of the output optical beam of the optical intensity modulator 11C-6 is cancelled by the output signal of the phase inverter 11C-5. The output of the optical intensity modulator 11C-6 is detected by means of optical heterodyning, the detection output (D) is split into two parts, and separated into an FM signal modulation component (E) and a pilot signal (F) by means of the bandpass filters 11E-1 and 11E-2.

According to the embodiment shown in FIG. 12, it is possible to obtain both a fluctuation component elimination effect by using the pilot signal, and an intensity fluctuation cancellation effect for the AM modulation components and the FM laser as with the embodiment shown in FIG. 8.

The embodiments of the present invention need not be restricted to those mentioned above. For example, as another embodiment, the structure may be such that bandpass filters 11E-1 and 11E-2 and a frequency mixer 11E-3 as shown in FIGS. 10~12 are added at the output of the photoelectric converter 112-3 of the AM/FM converter 11D shown in FIG. 7 at the position of the AM/FM converter 11K of FIG. 9A.

Next, another embodiment of the optical signal transmission system according to the present invention will be explained with reference to FIGS. 14A and 14B. The optical signal transmission system 102 shown in FIG. 14A comprises a predistortion circuit 6 provided before an SLT 1J, an SLT 1J, an optical transmission path 2, an attenuator 7, an ONU 3J, and a television receiver 4. The SLT 1J comprises an AM/FM converter 11J, a DFB laser 12, and an erbium-doped fiber amplifier 13. The ONU 3J comprises an APD 31 and an FM demodulation section 32J. The AM/FM converter 11J and the FM demodulation section 32J have structures as explained in the above embodiments. In the optical signal transmission system 102 shown in FIG. 14A, the predistortion circuit 6 cancels distortion by pre-forming distortion, in an amount needed to compensate for the distortion of later circuits, with opposite phase. The predistortion circuit 6 does not operate over wideband FM signals, as long as it operated within the frequency band of the AM video signals, for example 90 to 280 MHz, and may comprise a FET amplifier.

Figure 14A:
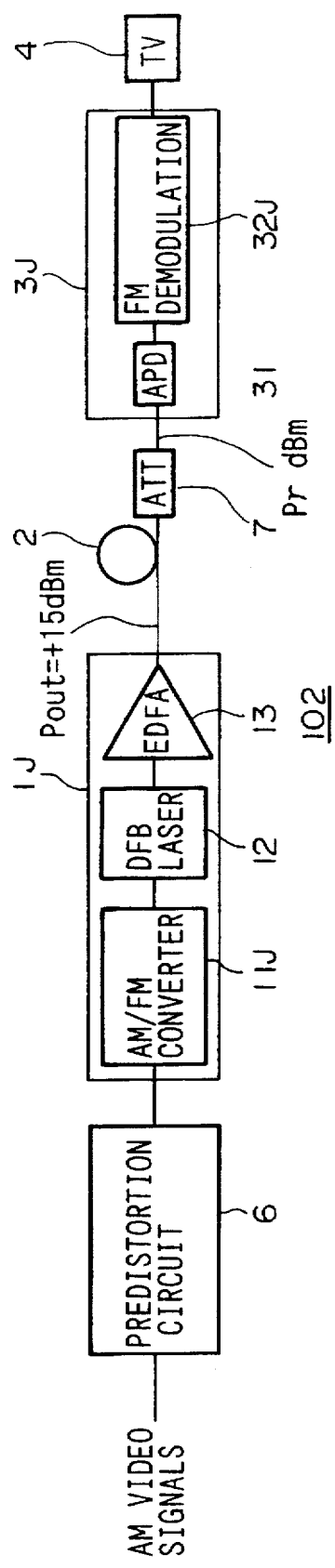
FIG. 14A is a block diagram showing another embodiment of the optical signal transmission system according to the present invention.
Figure 14B:
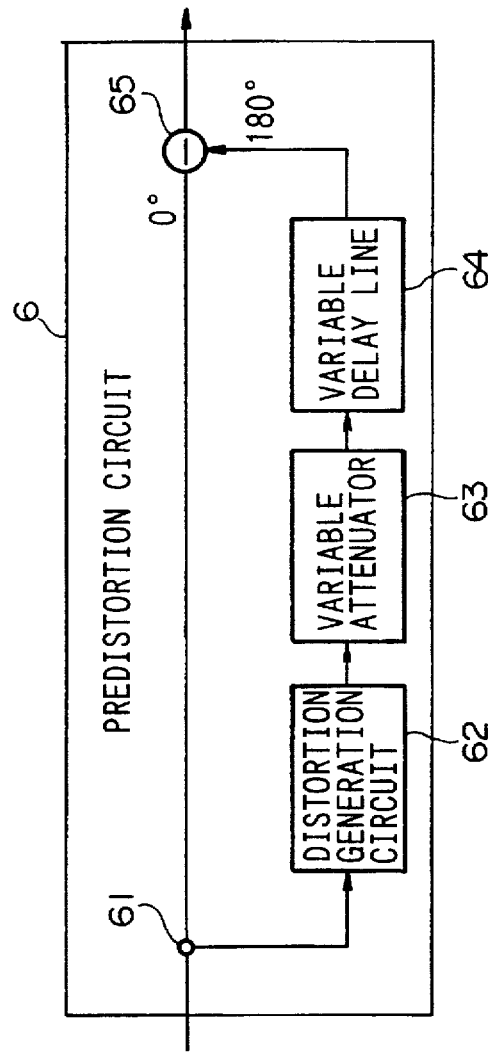
FIG. 14B is a block diagram showing a structural example of the predistortion circuit 6 shown in FIG. 14A.
Figure 16:
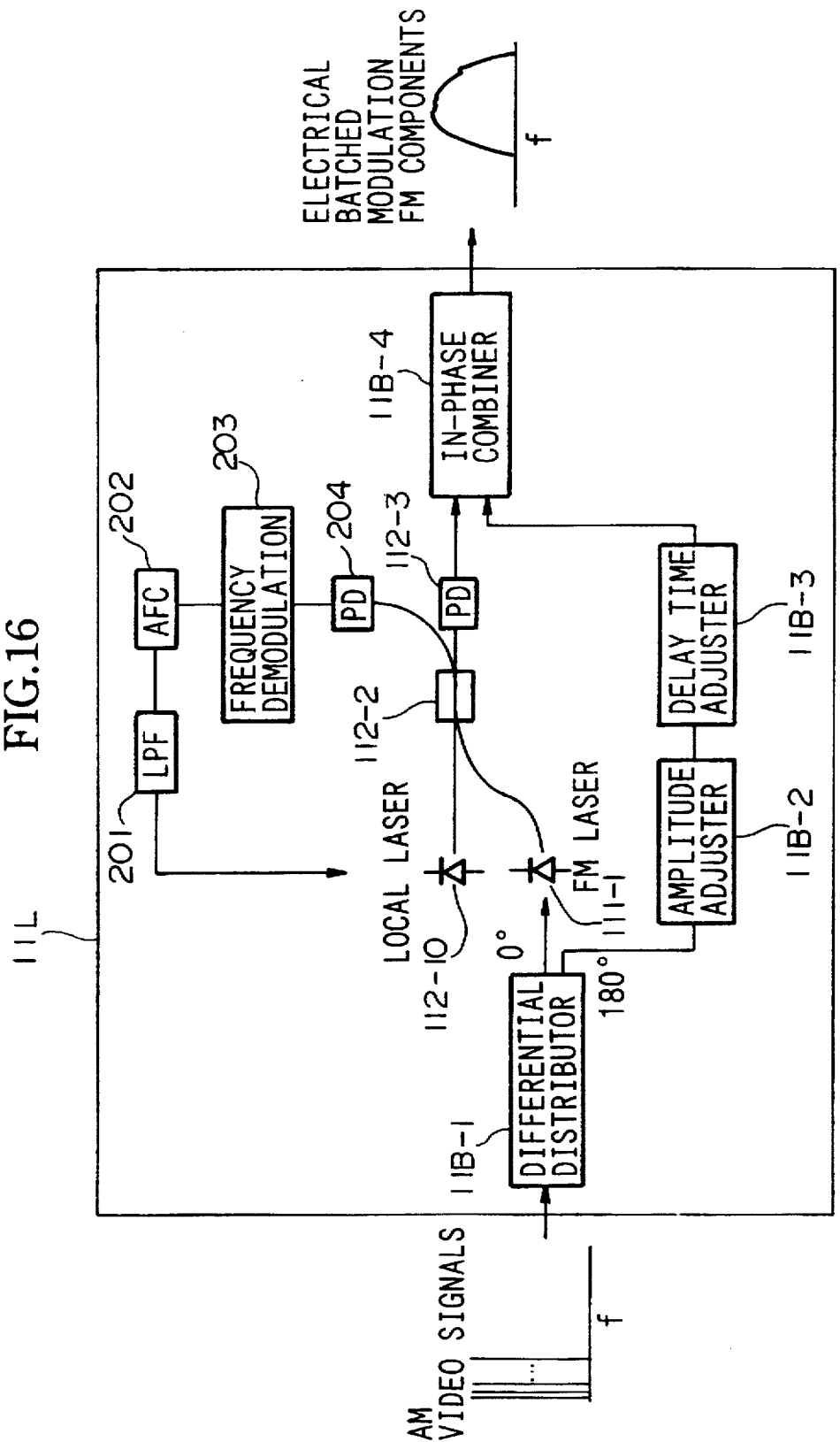
Figure 17:
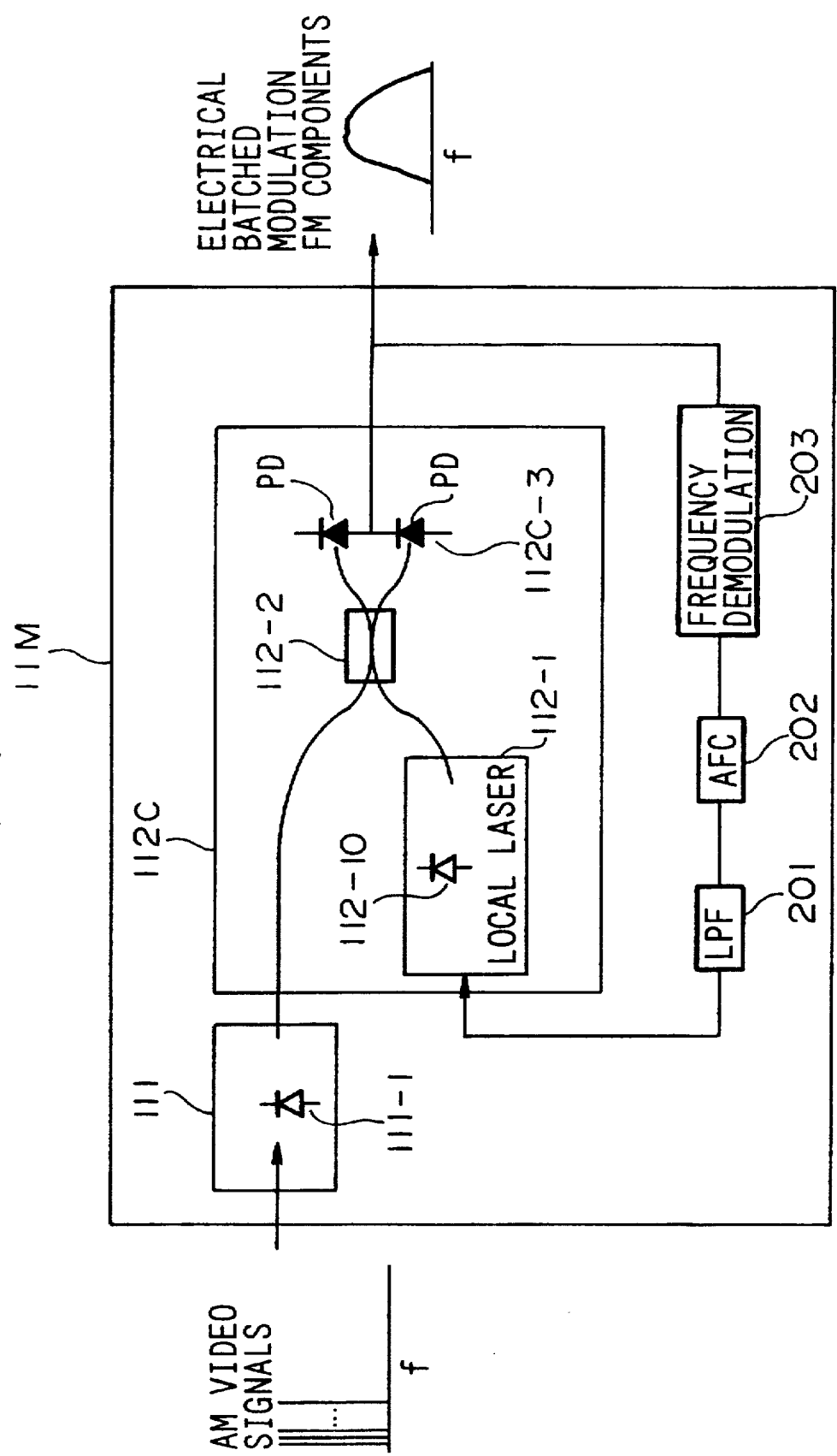
Figure 18:
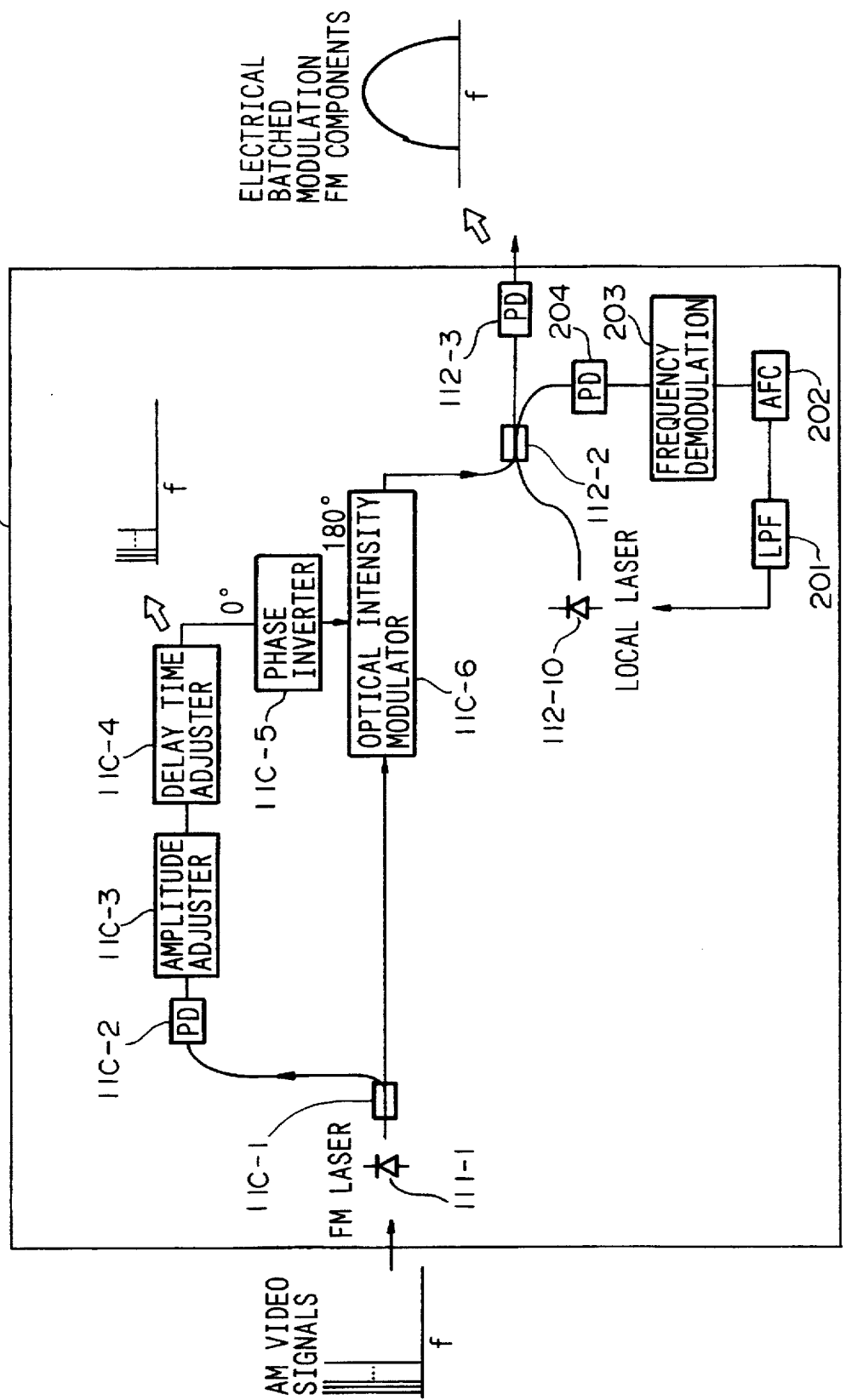

FIG. 14B is a block diagram showing a structural example of a predistortion circuit 6. The predistortion circuit 6 shown in FIG. 14B comprises an electrical signal splitter 61, a distortion generation circuit 62, a variable attenuator 63, a variable delay line 64 and a combiner 65. The inputted multi-channel AM video signals are split into two parts by the electrical signal splitter 61, which are inputted as the non-inverted input of the combiner 65 and inputted to the distortion generation circuit 62. The distortion generation circuit 62 applies a designated distortion to the input signals, and the variable attenuator 63 and variable delay line 64 adjust the intensity and phase of the signals. Then the signals outputted from the variable delay line 64 are inputted to the inverted input of the combiner 65 to be combined with the other signal split by the electrical signal splitter 61.

The predistortion circuit 6 compensates for the distortion created in the AM/FM converter 11J. It can further compensate for the distortion created in the FM demodulation section 32J of the ONU 3J, and still further compensate for the distortion created in the optical fiber transmission path 2. The distortion in the AM/FM converter 11J is caused by non-linearity of the dynamic characteristics of the output optical frequency characteristics with respect to the electrical current inputted to the FM laser, and by group delay deviations in the electrical amplifier which is used. The distortion in the FM demodulation section 32J of the ONU 3J is caused by group delay deviations in the electrical amplifier which is used, and by non-linearity of the output voltage characteristics with respect to the frequency inputted to the FM demodulation section 32J. Additionally, the distortion in the optical fiber transmission path 2 is caused by dispersion in the transmitting optical fiber.

While the present embodiment was explained with multi-channel AM video signals as the input signals, the explanation is the same with the input of frequency-division-multiplexed multi-channel QAM video signals as well. Additionally, the explanation is the same with the input of wideband analog or digital electrical signals even if they are not video signals.

In the embodiment shown in FIG. 14A, the output optical beam from a DFB laser 12 is amplified by providing an erbium-doped fiber amplifier 13 at the output stage of the SLT 1J, then inputting the beam to the ONU 3J after attenuation at the attenuator 7, but the positions and the number of amplifiers and attenuators need not be restricted to those explained for the present embodiment. Additionally, parts may be omitted when appropriate.

Next, another embodiment of the AM/FM converter according to the present invention will be explained with reference to FIGS. 15A and 15B. FIGS. 15A and 15B respectively show block diagrams of AM/FM converters which may, for example, be modification examples of the AM/FM converter 11 of FIG. 1B. With the structure shown in FIGS. 15A and 15B, the optical frequency fluctuations of the electrical batched FM signals are reduced by means of an AFC (auto frequency controller). The optical frequency fluctuations are caused by optical frequency fluctuations of the FM laser 111-1 and optical frequency fluctuations of the local laser 112-10 of the FM demodulation components, the low-frequency optical frequency fluctuation components inputted via the PD 204 and the FM demodulation section 203 are extracted by means of the lowpass filter 201. In this case, the input beam of the PD 204 is taken from a free output terminal of the beam splitter 112-2. The frequency of the FM laser 111-1 or the local laser 112-10 is negative-feedback-controlled by means of the fluctuation components extracted by the lowpass filter 201. As examples of negative feedback control methods, the input electrical current to the FM laser 111-10 or the local laser 112-10 may be varied, or their temperature may be varied.

While the present embodiment was explained with multi-channel AM video signals as the input signals, the explanation is the same with the input of frequency-division-multiplexed multi-channel QAM video signals as well. Additionally, the explanation is the same with the input of wideband analog or digital electrical signals even if they are not video signals.

With the present embodiment shown in FIGS. 15A and 15B, the noise generated by the optical frequency fluctuations of the batch-converted FM signals are able to be reduced.

The embodiments explained with reference to FIGS. 14A, 14B, 15A and 15B are not necessarily restricted to the arrangements shown in the drawings, and may be combined with any of the above-described optical signal transmission systems or AM/FM converters as appropriate, as shown by the examples of AM/FM converters 11L, 11M, 11N and 110 shown in FIGS. 16, 17, 18 and 19. The elements shown in FIGS. 16 through 19 have the same reference numerals as those used in the above-mentioned embodiments.

In addition thereto, it is possible to combine a structure as shown in FIGS. 4, 6, 7 and 8 wherein unwanted intensity components are eliminated by using signals having different phases with a structure as shown in FIGS. 9B–12 wherein frequency fluctuations are cancelled by using pilot signals; or to further combine these with a structure as shown in FIGS. 14A and 14B wherein distortion is reduced by means of a predistortion circuit. Furthermore, it is possible to combine a structure as shown in FIGS. 4, 6, 7 and 8 wherein unwanted intensity components are eliminated by using signals having different phases with a structure as shown in FIGS. 14A and 14B wherein distortion is reduced by means of a predistortion circuit; or to further combine these with a structure as shown in FIGS. 15A and 15B wherein optical frequency fluctuations are reduced by means of an AFC.

We claim:

1. An AM/FM converter, comprising:

optical frequency modulation means for receiving an electrical signal and outputting an optical-frequency-modulated optical signal beam; and an optical heterodyne detection section, having optical frequency oscillation means for outputting a local oscillator optical beam with an optical frequency separated from that of said optical signal beam by a designated intermediate frequency, optical coupling means for coupling said optical signal beam and said local oscillator optical beam, and a photoelectric converter for obtaining an output as an electrical signal, which receives said optical signal beam and outputs a modulation signal which is frequency-modulated and frequency-converted to said intermediate frequency.

2. An AM/FM converter according to claim 1, wherein:

the value of a ratio $P_{FM}/P_{LO}$ between the power $P_{FM}$ of said optical signal beam and the power $P_{LO}$ of said local oscillator optical beam when inputted to said photoelectric converter is at least −8 dB and at most +8 dB.

3. An AM/FM converter according to claim 2, wherein:

said optical frequency modulation means receives a multi-channel AM video signal as said electrical signal;

the value of said ratio $P_{FM}/P_{LO}$ is set so that the carrier-to-noise ratio of an amplitude-modulated video signal obtained by frequency-demodulating said modulation signal is at least 42 dB.

4. An AM/FM converter according to claim 3, further comprising unnecessary intensity component elimination means for eliminating unnecessary intensity components generated by at least one of said optical frequency modulation means and said optical frequency oscillation means.

5. An AM/FM converter according to claim 4, wherein said unnecessary intensity component elimination means comprises distribution means, inserted directly in front of said optical frequency modulation means, for distributing said input electrical signal; and combining means for combining one of the outputs of said distribution means with the output of said optical heterodyne detection section in an opposite phase relation.

6. An AM/FM converter according to claim 4, wherein said unnecessary intensity component elimination means comprises two photoelectric converters in a balanced receiver configuration provided in said optical heterodyne detection section.

7. An AM/FM converter according to either claim 5 or 6, further comprising:
frequency-demodulation means for frequency-demodulating the modulation signal outputted by said optical heterodyne detection section; and
feedback means, for extracting optical frequency fluctuations of said optical signal beam and said local oscillator optical beam from the output signal of said frequency-demodulation means, and applying negative feedback control to the optical frequency of at least one of said optical frequency modulation means and said optical frequency oscillation means based on the results of said extraction.

8. An AM/FM converter according to claim 3, further comprising a predistortion circuit for predistorting the input electrical signal before said electrical signal is inputted to said optical frequency modulation means.

9. An AM/FM converter according to claim 3, further comprising:
frequency-demodulation means for frequency-demodulating the modulation signal outputted by said optical heterodyne detection section; and
feedback means, for extracting optical frequency fluctuations of said optical signal beam and said local oscillation beam from the output signal of said frequency-demodulation means, and applying negative feedback control to the optical frequency of at least one of said optical frequency modulation means and said optical frequency oscillation means based on the results of said extraction.

10. An AM/FM converter according to claim 2, further comprising unnecessary intensity component elimination means for eliminating unnecessary intensity components generated by at least one of said optical frequency modulation means and said optical frequency oscillation means.

11. An AM/FM converter according to claim 10, wherein said unnecessary intensity component elimination means comprises distribution means, inserted directly in front of said optical frequency modulation means, for distributing said input electrical signal; and combining means for combining one of the outputs of said distribution means with the output of said optical heterodyne detection section in an opposite phase relation.

12. An AM/FM converter according to claim 10, wherein said unnecessary intensity component elimination means comprises two photoelectric converters in a balanced receiver configuration provided in said optical heterodyne detection section.

13. An AM/FM converter according to either claim 11 or 12, further comprising:
frequency-demodulation means for frequency-demodulating the modulation signal outputted by said optical heterodyne detection section; and
feedback means, for extracting optical frequency fluctuations of said optical signal beam and said local oscillator optical beam from the output signal of said frequency-demodulation means, and applying negative feedback control to the optical frequency of at least one of said optical frequency modulation means and said optical frequency oscillation means based on the results of said extraction.

14. An AM/FM converter according to claim 2, further comprising a predistortion circuit for predistorting the input electrical signal before said electrical signal is inputted to said optical frequency modulation means.

15. An AM/FM converter according to claim 2, further comprising:
frequency-demodulation means for frequency-demodulating the modulation signal outputted by said optical heterodyne detection section; and
feedback means, for extracting optical frequency fluctuations of said optical signal beam and said local oscillation beam from the output signal of said frequency-demodulation means, and applying negative feedback control to the optical frequency of at least one of said optical frequency modulation means and said optical frequency oscillation means based on the results of said extraction.

16. An AM/FM converter according to claim 1, further comprising unnecessary intensity component elimination means for eliminating unnecessary intensity components generated by at least one of said optical frequency modulation means and said optical frequency oscillation means.

17. An AM/FM converter according to claim 16, wherein said unnecessary intensity component elimination means comprises distribution means, inserted directly in front of said optical frequency modulation means, for distributing said input electrical signal; and combining means for combining one of the outputs of said distribution means with the output of said optical heterodyne detection section in an opposite phase relation.

18. An AM/FM converter according to claim 16, wherein said unnecessary intensity component elimination means comprises two photoelectric converters in a balanced receiver configuration provided in said optical heterodyne detection section.

19. An AM/FM converter according to claim 16, wherein said unnecessary intensity component elimination means comprises distribution means, inserted directly in front of said optical frequency modulation means, for distributing said input electrical signal; and optical intensity modulation means, inserted between an output of said optical frequency modulation means and an input of said optical heterodyne detection section, for intensity-modulating said optical signal beam by means of one of the outputs of said distribution means.

20. An AM/FM converter according to claim 16, wherein said unnecessary intensity component elimination means comprises:
optical beam splitting means for splitting the output of said optical frequency modulation means into two optical beams;
optical intensity modulation means, connected to one of the outputs of said optical beam splitting means, for outputting to said optical heterodyne detection section; and
a third photoelectric converter, connected to the other output of said optical beam splitting means, for outputting an electrical signal converted from an optical signal and inputting to said optical intensity modulation means at opposite phase, to perform optical intensity modulation.

21. An AM/FM converter according to claim 1, further comprising a predistortion circuit for predistorting the input electrical signal before said electrical signal is inputted to said optical frequency modulation means.

22. An AM/FM converter according to claim 1, further comprising:
frequency-demodulation means for frequency-demodulating the modulation signal outputted by said optical heterodyne detection section; and feedback means, for extracting optical frequency fluctuations of said optical signal beam and said local oscillator optical beam from the output signal of said frequency-demodulation means, and applying negative feedback control to the optical frequency of at least one of said optical frequency modulation means and said optical frequency oscillation means based on the results of said extraction.

23. An AM/FM converter according to claim 1, further comprising:

multiplexing means for superimposing a pilot signal onto the input electrical signal of said optical frequency modulation means; and noise elimination means for extracting a first component relating to said input electrical signal and a second component relating to said pilot signal from said modulation signal, and eliminating noise arising from fluctuations in said optical signal beam and said local oscillator optical beam by mixing said first component and said second component.

24. An optical signal transmission system, comprising:

an optical transmission device having an AM/FM converter, comprising optical frequency modulation means for receiving an electrical signal and outputting an optical-frequency-modulated optical signal beam, and an optical heterodyne detection section, having optical frequency oscillation means for outputting a local oscillator optical beam with an optical frequency separated from that of said optical signal beam by a designated intermediate frequency, optical coupling means for coupling said optical signal beam and said local oscillator optical beam, and a photoelectric converter for obtaining an output as an electrical signal, which receives said optical signal beam and outputs a modulation signal which is frequency-modulated and frequency-converted to said intermediate frequency; and a transmission means for outputting a transmission optical beam intensity-modulated by the output of said AM/FM converter;

an optical transmission path; and an optical receiving device, connected to said optical transmission device via said optical transmission path, comprising a photoelectric converter and frequency-demodulation means for frequency-demodulating the output of said photoelectric converter.

25. An optical signal transmission system according to claim 24, wherein:

the value of a ratio $P_{FM}/P_{LO}$ between the power $P_{FM}$ of said optical signal beam and the power $P_{LO}$ of said local oscillator optical beam when inputted to said photoelectric converter is at least −8 dB and at most +8 dB.

26. An optical signal transmission system according to claim 25, wherein said optical frequency modulation means receives a multi-channel AM video signal as said electrical signal;

the value of said ratio $P_{FM}/P_{LO}$ is set so that the carrier-to-noise ratio of an amplitude-modulated video signal obtained by frequency-demodulating said modulation signal is at least 42 dB.

27. An optical signal transmission system according to claim 24, wherein said optical transmission device further comprises unnecessary intensity component elimination means for eliminating unnecessary intensity components generated by at least one of said optical frequency modulation means and said optical frequency oscillation means.

28. An optical signal transmission system according to claim 24, further comprising a predistortion circuit for predistorting the input electrical signal before said electrical signal is inputted to said optical frequency modulation means.

29. An optical signal transmission system according to claim 24, wherein said optical transmission device further comprises:

frequency-demodulation means for frequency-demodulating the modulation signal outputted by said optical heterodyne detection section; and feedback means, for extracting optical frequency fluctuations of said optical signal beam and said local oscillator optical beam from the output signal of said frequency-demodulation means, and applying negative feedback control to the optical frequency of at least one of said optical frequency modulation means and said optical frequency oscillation means based on the results of said extraction.

30. An optical signal transmission system according to claim 24, wherein said optical transmission device further comprises:

multiplexing means for superimposing a pilot signal onto the input electrical signal of said optical frequency modulation means; and noise elimination means for extracting a first component relating to said input electrical signal and a second component relating to said pilot signal from said modulation signal, and eliminating noise arising from fluctuations in said optical signal beam and said local oscillator optical beam by mixing said first component and said second component.

31. An optical signal transmission system according to claim 24, wherein:

said optical frequency modulation means receives a multi-channel AM video signal as said electrical signal;

the value of said ratio $P_{FM}/P_{LO}$ is set so that the carrier-to-noise ratio of an amplitude-modulated video signal obtained by frequency-demodulating said modulation signal is at least 42 dB.

* * * * *

UNITED STATES PATENT AND TRADEMARK OFFICE
CERTIFICATE OF CORRECTION

PATENT NO. : 5,896,216
DATED : April 20, 1999
INVENTOR(S) : Koji KIKUSHIMA et al.

It is certified that error appears in the above-identified patent and that said Letters Patent is hereby corrected as shown below:

Title page, item [54], line 1, "AM/PM CONVERTER" should read --AM/FM CONVERTER--.

Column 1, line 1, Title of Invention, "AM/PM CONVERTER" should read --AM/FM CONVERTER--.

Signed and Sealed this

Fifth Day of October, 1999

Attest:

Q. TODD DICKINSON

*Attesting Officer*              *Acting Commissioner of Patents and Trademarks*